United States Patent
Potts

(10) Patent No.: US 9,174,863 B2
(45) Date of Patent: Nov. 3, 2015

(54) LEACH FIELD SYSTEM

(71) Applicant: David A. Potts, Killingsworth, CT (US)

(72) Inventor: David A. Potts, Killingsworth, CT (US)

( * ) Notice: Subject to any disclaimer, the term of this patent is extended or adjusted under 35 U.S.C. 154(b) by 0 days.

(21) Appl. No.: 13/682,506

(22) Filed: Nov. 20, 2012

(65) Prior Publication Data

US 2013/0126407 A1    May 23, 2013

Related U.S. Application Data

(60) Continuation of application No. 12/730,817, filed on Mar. 24, 2010, which is a division of application No. 12/042,667, filed on Mar. 5, 2008, now abandoned, which is a continuation-in-part of application No. 11/340,917, filed on Jan. 27, 2006, now Pat. No. 7,374,670, which is a continuation-in-part of application No. 11/144,968, filed on Jun. 3, 2005, now Pat. No. 7,465,390.

(60) Provisional application No. 60/576,950, filed on Jun. 4, 2004, provisional application No. 60/945,398, filed on Jun. 21, 2007.

(51) Int. Cl.
| | |
|---|---|
| E02B 11/00 | (2006.01) |
| C02F 3/10 | (2006.01) |
| B09C 1/00 | (2006.01) |
| C02F 3/04 | (2006.01) |
| E03F 1/00 | (2006.01) |
| C02F 3/02 | (2006.01) |
| C02F 1/00 | (2006.01) |

(52) U.S. Cl.
CPC .............. *C02F 3/104* (2013.01); *B09C 1/002* (2013.01); *C02F 1/00* (2013.01); *C02F 3/02* (2013.01); *C02F 3/046* (2013.01); *E03F 1/002* (2013.01); *Y02W 10/15* (2015.05)

(58) Field of Classification Search
CPC ..................................................... E02B 11/005
USPC ......... 405/36, 39–40, 43–45, 50; 210/170.08, 210/747.1
See application file for complete search history.

(56) References Cited

U.S. PATENT DOCUMENTS

| | | | |
|---|---|---|---|
| 848,279 | A | 3/1907 | Ashley |
| 956,665 | A | 5/1910 | Ashley |

(Continued)

FOREIGN PATENT DOCUMENTS

| | | |
|---|---|---|
| DE | 3814586 A1 | 9/1989 |
| JP | 56156313 A | 3/1981 |

OTHER PUBLICATIONS

Document Production Bates Numbered POTTS00337-76 from *Potts v. S-Box*, USDC for District of CT (New Haven), Civil Docket No. #3:09-cv-00035-AWT.

(Continued)

*Primary Examiner* — Sunil Singh
(74) *Attorney, Agent, or Firm* — Grasso PLLC; Fred Grasso

(57) ABSTRACT

A wastewater system is provided. The system includes channels and conduits for wastewater guidance and discharge. High aspect ratio channels and one or more distribution conduits are provided in the system such that wastewater, such as septic wastewater, is discharged from the system and into the system surroundings. The high aspect ratio channels are spaced apart from each other to allow for the discharge of the wastewater effluent from the system between the channels. The channels have a high height to width aspect ratio.

28 Claims, 15 Drawing Sheets

(56) References Cited

U.S. PATENT DOCUMENTS

| | | | |
|---|---|---|---|
| 2,397,655 | A | 4/1946 | Francis |
| 3,478,524 | A | 11/1969 | Hoppe |
| 3,680,704 | A | 8/1972 | Schaefer |
| 4,013,559 | A | 3/1977 | Johnson |
| 4,065,925 | A | 1/1978 | Auriemma |
| 4,102,135 | A | 7/1978 | Auriemma |
| 4,183,696 | A | 1/1980 | Auriemma |
| 4,246,305 | A | 1/1981 | Delattre |
| 4,313,692 | A | 2/1982 | Johnson |
| 4,662,778 | A | 5/1987 | Dempsey |
| 4,730,953 | A | 3/1988 | Tarko |
| 4,824,287 | A | 4/1989 | Tracy |
| 4,880,333 | A | 11/1989 | Glasser et al. |
| 4,904,112 | A | 2/1990 | McDonald |
| 4,904,113 | A | 2/1990 | Goddard |
| 4,917,536 | A | 4/1990 | Glasser |
| 4,948,295 | A | 8/1990 | Pramsoler |
| 5,017,040 | A | 5/1991 | Mott |
| 5,017,042 | A | 5/1991 | Minor |
| 5,129,758 | A | 7/1992 | Lindstrom |
| 5,263,792 | A | 11/1993 | Davis et al. |
| 5,378,357 | A | 1/1995 | Houck |
| 5,597,264 | A | 1/1997 | Laak |
| 5,639,364 | A | 6/1997 | Houck |
| 5,752,784 | A | 5/1998 | Motz |
| 5,887,625 | A | 3/1999 | Takahashi |
| 5,951,203 | A | 9/1999 | Laak |
| 5,989,416 | A | 11/1999 | Gorton |
| 5,997,735 | A | 12/1999 | Gorton |
| 6,048,131 | A | 4/2000 | Laak |
| 6,270,661 | B1 | 8/2001 | Jowett |
| 6,280,117 | B1 | 8/2001 | Obermeyer et al. |
| 6,485,647 | B1 | 11/2002 | Potts |
| 6,531,063 | B1 | 3/2003 | Rose |
| 6,659,687 | B1 | 12/2003 | Donlin et al. |
| 6,869,533 | B2 | 3/2005 | Norgaard |
| 7,614,822 | B1 | 11/2009 | Burritt et al. |
| 8,104,994 | B1 * | 1/2012 | Donlin .................... 405/45 |
| 2002/0044833 | A1 | 4/2002 | Kruger |
| 2007/0292210 | A1 | 12/2007 | Currivan |
| 2008/0203002 | A1 | 8/2008 | Potts |
| 2009/0269137 | A1 | 10/2009 | Bussey, Jr. |

OTHER PUBLICATIONS

Eljen Corporation, Mini/Max Absorption System, East Hartford CT.
Form Cell Research, Inc., Bioren/Living Filter System, http://pages.prodigy.net/formcell/FCRWEBPA2.html.
Gilman Letter to Calsha with Attachments, Eljen In-Drain System, Letters, and Plans, Oct. 8, 1986.
Ruck Systems, Ruck "A" Units, http://www.rucksystems.com/rucka/.
Crites et al. Small and Decentralized Wastewater Systems, Gravity Leachfields and Shallow Graviy Distribution, pp. 924-927, WCB McGraww-Hill, 1998.
U.S. Environmental Protection Agency, Office of Water Program Operations, Office of Research and Development Municipal Environmental Research Laboratory, Design Manual Onsite Wastewater Treatment and Disposal Systems, EPQ 625/1-80-012, Oct. 1980.
The Official State of Connecticut Website, http://www.ct.gov, Apr. 13, 2010.
Keys, J.R. et al., Small Scale Waste Management Project, Predicting Life for Wastewater Absoprtion Systems, Proceedings of the Eigth Ntional Sympsium on Individual and Small Community Sewage Systems, ASAW publication Mar. 1998. American Sociaety of Agricultural Engineers, Orlando FL, 1998 pp. 167-176.
State of Connecticut Department of Public Health, Design Manual, Subsurface Sewage Disposal Systems for Households and Small Commercial Buildings, Jul. 1998.
Washington State Department of Health, Rule Development Committee Issue Research Report, Staff Researcher Selden Hall, SCHissue#12A.doc, Jun. 2002.
Eljen Corporation, Mantis 430-10 Design & Installation Guidelines, East Hartford, CT.
PCT Intl. Search Report and Written Opinion for PCT Application PCT/US200/085448, Feb. 9, 2009.
Laak, R., Using In-Drains At Soil Clogging Infiltrations Surface, American Society of Agricultural Engineers, Paper No. 88-2070, Jun. 26-29, 1988.
Laak, R., Using In-Drain Geosynthetics in Soil Infiltration Systems, American Society of Agricultural Engineers, Canadian Society of Agricultural Engineers, Quebec, CA, Jun. 25-28, 1989.
Brochure, "AdvanEDGE Pipe—Engineered panel pipe for superior quick-response drainage" Advanced Drainage Systems, Inc., Hilliard, OH, Apr. 2001.
Brochure, RainStore3—Invisible Structures.com, 2003-2005.
Webpage, Surefoot4, May 6, 2010.
Brochure, Slopetame2—Invisible Structures, Inc. 2007.
Hepner, et al. "Alternative On-Lot Technology Research, Soil-Based Treatment Systems" Delaware Valley College, Oct. 29, 2005.
Potts et al. "Effects of Aeration on Water Quality from Septic System Leachfields," J. Environ. Qual., 33:1828-1838, 2004.

* cited by examiner

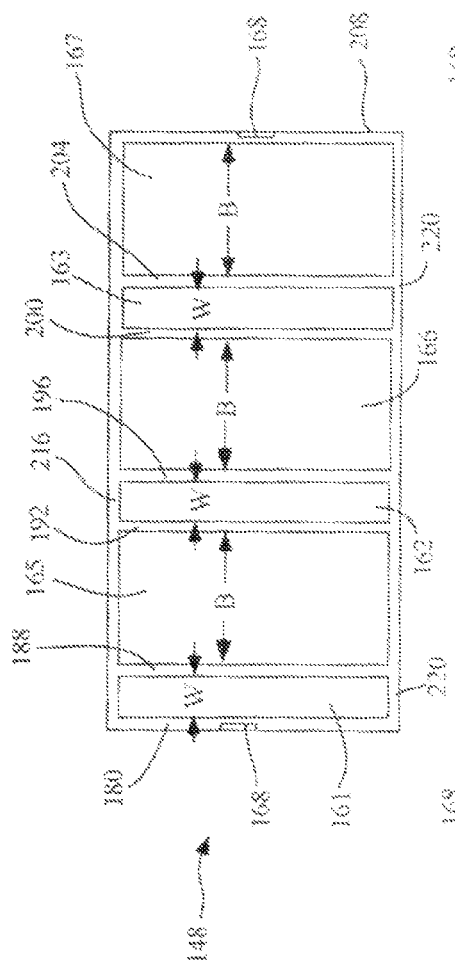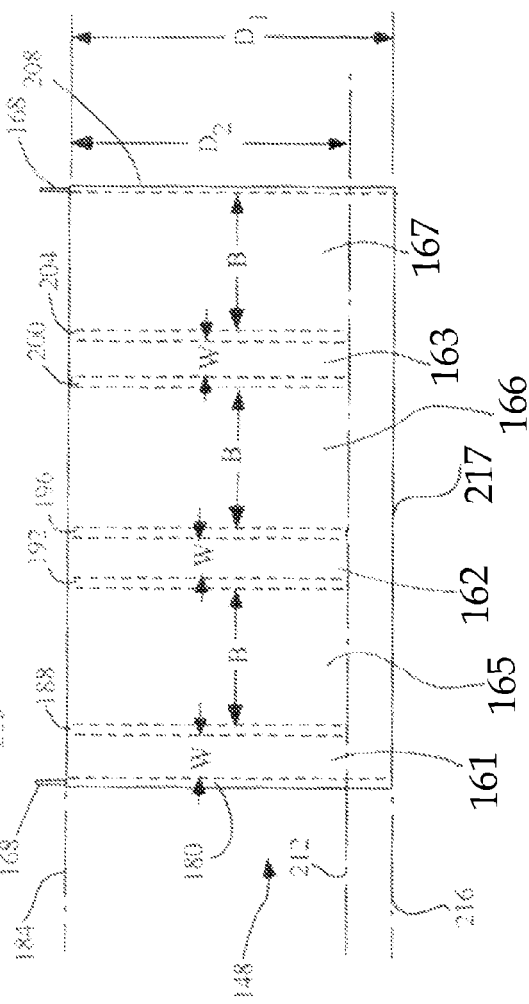

LEACH FIELD SYSTEM

CROSS-REFERENCES

This application is a continuation of U.S. patent application Ser. No. 12/730,817, filed Mar. 24, 2010, entitled "Leach Field Form and Method of Use," to David A. Potts, which is a Division of U.S. patent application Ser. No. 12/042,667, filed Mar. 5, 2008, entitled "Leach Field Form and Method of Use," to David A. Potts, which is a continuation-in-part of U.S. patent application Ser. No. 11/340,917, filed on Jan. 27, 2006, entitled "High Aspect Ratio Wastewater System," by David A. Potts, now U.S. Pat. No. 7,374,670, which is a continuation-in-part of U.S. patent application Ser. No. 11/144,968, filed on Jun. 3, 2005, entitled "Low Aspect Ratio Wastewater System", by David A. Potts, now U.S. Pat. No. 7,465,390, the contents of all which are incorporated by reference herein in their entirety. Also, U.S. Pat. No. 7,465,390 claims the benefit of U.S. patent application Ser. No. 60/576,950, filed on Jun. 4, 2004, by David A. Potts, entitled "Low Aspect Ratio Leaching Chamber" and U.S. patent application Ser. No. 12/042,667 further claims the benefit of U.S. Provisional Application No. 60/945,398, filed on Jun. 21, 2007, entitled "High Treatment Efficiency Leach Field and Removable Form for Shaping a Leach Field" by David A. Potts.

TECHNICAL FIELD

The present invention relates to leach fields and aerobic treatment of wastewater within soil, and more particularly to a high aspect ratio wastewater system and leaching conduit.

BACKGROUND

Known leaching conduits, such as arch shape cross section molded plastic chambers, or stone filled trenches with perforated pipe, used for domestic and commercial wastewater systems provide interior void space, based on the thinking that a buffer space or flow equalization is thus provided for variations of inflow of wastewater. The sidewalls of conduits, where they interface with the surrounding soil, are also commonly conceived as providing surface area for percolation of wastewater, in addition to the bottom surface of the conduit. A familiar crushed stone filled trench, having a modest (4 inch) diameter perforated pipe running along its length may have about 50% void space. Currently, arch shape cross-section molded plastic leaching chambers have entirely open interiors, open bottoms and sloped and perforated sidewalls. A common cross section shape for each typical conduit has a width of about 30 to 36 inches and a height of about 12 to 18 inches. Thus this conduit may have from about 12 inches to about 18 inches of water depth at any one time. It has been seen that in these prior art conduits, a biomat will often form on the bottom and sides of the conduit, thereby lessening the effectiveness of the leaching conduits to properly infiltrate the wastewater into the soil. Drip irrigation lines are usually approximately one half inch in diameter and are typically buried 12 to 6 inches below grade.

Leaching conduits are typically covered with 6 to 12 inches or more of soil, for several reasons. One is to protect the conduits from damage. Another is to prevent contact of humans and animals with potentially deleterious microorganisms associated with the wastewater being treated. Still another is to prevent odors. The dimensions of the conduits discussed in the preceding paragraph would lead to the fact that the bottom surface of the conduits are typically at about 24 inches or more below the soil surface.

Generally, it is an aim to have aerobic treatment of the wastewater in the soil. Current thinking with prior art systems is that there is an air-soil gas interchange, so that oxygen is continuously supplied to the soil, to enable good microbiological treatment. However, the soil depths at which prior art conduits operate are disadvantaged in this respect. Since the bottom surface of the conduits are typically about 18 to 24 inches below the soil surface, the bottom surfaces of the conduits are often in an anaerobic condition since the oxygen demand exceeds the oxygen supply. One improvement with such systems is to force air serially through the conduit and soil influence zone which surrounds the conduit, as described in U.S. Pat. No. 6,485,647 to David Potts, issued on Nov. 26, 2002, and which is incorporated herein by reference in its entirety.

Therefore, a wastewater system is needed that provides for greater aerobic conditions in leaching conduits, thereby allowing for greater processing of the wastewater prior and during absorption into the soil.

SUMMARY

The disclosed invention relates to a leach field form comprising: a container with an open bottom and an open top, and four exterior walls of a first height, and at least one interior wall; at least one geonet volume with an open bottom and an open top located in the container; at least one granular volume with an open bottom and an open top located in the container; and where any of the at least one geonet volumes is separated from any adjacent granular volume by an interior wall.

The disclosed invention also relates to a method of making a leach field using a leach field form comprising: digging a trench; placing a leach field form in the trench; backfilling the trench, allowing backfill to fill any granular volumes in the form; inserting geonet into geonet volume located in the form; and removing the form from the trench.

The disclosed invention also relates to a leach field form comprising: a container with an open bottom and an open top; at least one geonet volume with an open bottom and an open top located in the container.

The disclosed invention also relates to a leach field form comprising: an open bottomed and open topped container comprising: a first end wall, having a first height; a front wall, having a first height, and adjoining the first end wall, with the top of the front wall and the top of the first end wall being generally coplanar; a rear wall, having a first height, and adjoining the first end wall, with the top of the front wall and the top of the rear wall being generally coplanar; a plurality of interior walls having a second height, and the plurality of interior walls adjoin the front wall and the rear wall with the tops of the interior walls, front wall and rear wall being generally coplanar; and where the interior walls are configured to form at least one volume of a first width, and at least one volume of a second width, and where the first width corresponds to a width of a geonet volume and the second width corresponds to a width of a granular volume.

BRIEF DESCRIPTION OF THE DRAWINGS

The present disclosure will be better understood by those skilled in the pertinent art by referencing the accompanying drawings, where like elements are numbered alike in the several figures, in which:

FIG. 22 is a top view of the high aspect conduit form from FIG. 21;

FIG. 23 is a side view of the high aspect conduit form from FIG. 21;

DETAILED DESCRIPTION

Low Aspect Ratio Conduit

In the present invention, as illustrated by the FIGS. 1 through 12, conduit 20 has a much lower aspect ratio (height divided by width) than conduits in the prior art. Thus, the bottom of the conduit can be positioned closer to the surface of the soil. And, it is an option to install a leaching system by laying a multiplicity of conduits 20 on the soil grade and to then cover them with appropriately chosen media and/or soil. This approach is especially advantageous for leaching system sites having shallow depths of native soil, such as those which overlie a high water table or ledge, and the like. The disclosed conduits may be installed in spaced apart rows, or in segments which are spaced apart, all interconnected by suitable distribution lines. In the following, one conduit segment or length is described.

Figure 1:
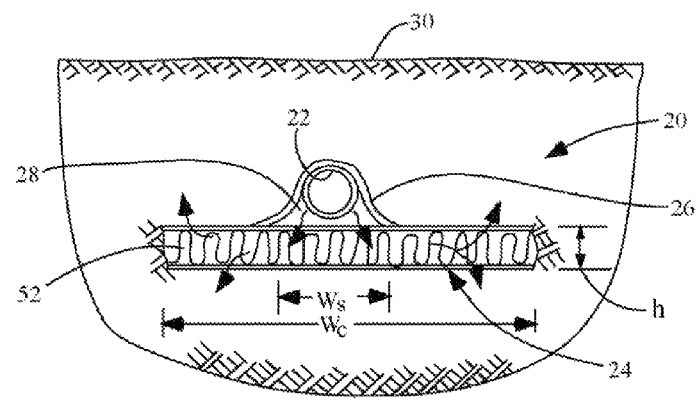
FIG. 1 is a cross-sectional view of a disclosed low aspect ratio leaching conduit.

In one embodiment, shown in FIG. 1, the disclosed conduit 20 comprises a perforated dosing pipe 22 which overlies a low aspect channel 24 all of which lie beneath a soil surface 30. The low aspect channel 24 is approximately rectangular shaped in this cross-sectional view. The pipe 22 distributes the wastewater relatively evenly along the length of the channel 24. A dosing pipe will typically be of a small diameter, for instance from about ¾ to about 2 inch in diameter. The pipe has suitable small spaced apart openings along its length, which openings may be smaller near its water source and larger farther away. A geotextile shroud 26 drapes over the pipe 22, so it runs downwardly and laterally outward, onto the top surface of low aspect channel 24. The shroud extends to the outer edges of the channel 24, to keep soil from infiltrating vertically down into the voids of the channel 24. The shroud provides assurance that there will be good water flow path from the pipe perforations and underside of the pipe, to the top of the channel 24. Optionally, some crushed stone, or plastic pieces or other granular or permeable media, may be placed in the space 28 under the shroud 26, near the pipe 22. With reference to FIG. 1, in one embodiment, the top of the low aspect channel 24 may be considered essentially planar, because as shown in the end view of FIG. 1, the shroud width "wS", that is the width of the base of the vaguely triangular cross section which comprises the region defined by the sloping surfaces of the shroud 26 is a small fraction of the channel width "wC". Alternatively, the shroud 26 may be a preformed shape permeable material, such as perforated molded plastic. In another variation, the shroud may be impermeable when used with blower systems and since the preponderance of the top of the channel 24 will be permeable. If a blower is in fluid communication with the low aspect ratio channel, the blower may be configured to intermittently blow air and/or some other gas through the channel 24 in order to assist in drying out the adjacent soil and to prevent biological buildup. Additionally, the blower may be configured to provide oxygen to the conduit and assist in dissipating water into the soil. The blower may also be configured to keep the dosing pipe and perforations from clogging with organic matter. The blower may dissipate water from the soil such that it prevents freezing around the conduit. The entire conduit can also be made of crushed stone, or plastic pieces or other granular or permeable media in substitution for the "geonet". This is true with both the low aspect channel and high aspect channel described below.

Figure 2:
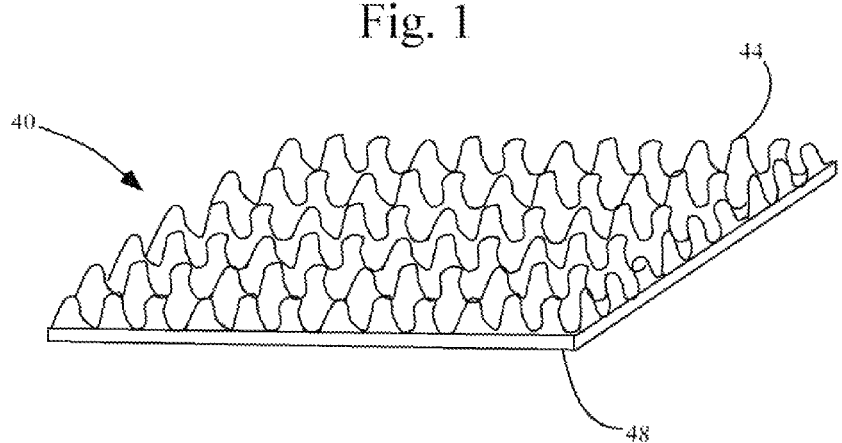
FIG. 2 is a perspective view of a geonet.
Figure 3:
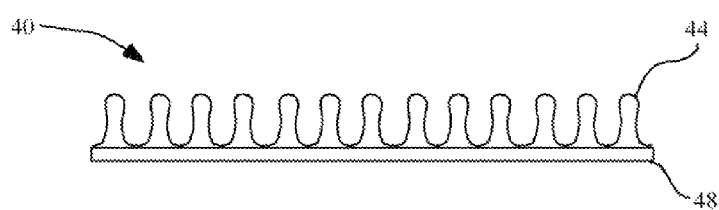
FIG. 3 a front view of the geonet from FIG. 2.
Figure 4:
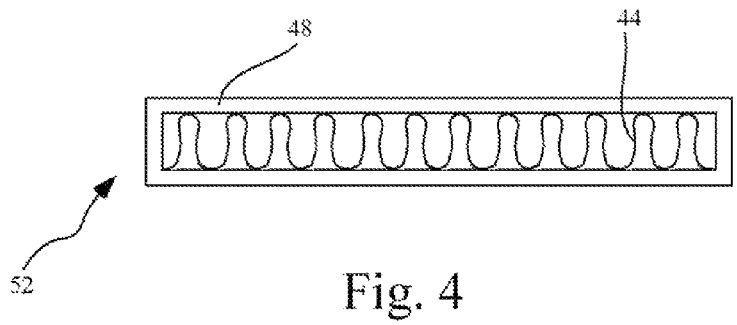
FIG. 4 is a front view of another embodiment of the disclosed geonet.

The low aspect channel may have a geonet 40 located within it. The geonet 40 may be obtained from various manufacturers, such as, but not limited to: Enkadrain drainage system product No. 9120 from Colbond Inc., P.O. Box 1057, Enka, N.C. 28728; and the several geonets named Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. Referring now to FIG. 2, a perspective view of a geonet 40 is shown. The geonet 40 is typically comprised of an irregularly coiled stringy structure 44 contained between one or two layers of air-permeable sheeting 48, which layers may feel to the touch like thin felt, and which is commonly and generically called geotextile. In one embodiment, the geonet 40 has only one layer and one side of the layer has the irregularly coiled string plastic structure, as shown in FIG. 2 and FIG. 3 which is a side view of the geonet 40. The low aspect channel 24, comprising the geonet 40, may have an estimated void volume of about 90%.

In one embodiment, the low aspect channel 24 will have a thickness, or height "h" as shown in FIG. 1, of about ¾ inch. The channel width "$w_c$", or lateral dimension of the channel 24 may be about 12 to about 48 inches, and preferably about 12 to about 40 inches. Optionally, geotextile may be placed at the opposing side of the vertical edges of the channel 24, to stop potential ingress of soil. In use, wastewater introduced into the low aspect channel 24 will percolate into the soil in the downward direction primarily, to a lesser extent in the sideways directions owing to the small vertical edge dimension, and also in the upward direction, when the conduit is full. Since the top of the conduit is permeable to air, there is good microbiological functioning of the leaching system, since air from the soil between the channel 24 and the surface can diffuse into the channel 24. If a geonet is used which has both a top and a bottom layer of air and water-permeable sheeting 48, such as the geonet 52 shown in FIG. 4, the local portion of the top layer in vicinity of the pipe 22 may be removed, and the shroud 26 need only extend laterally a small distance from the pipe 22.

Figure 5:
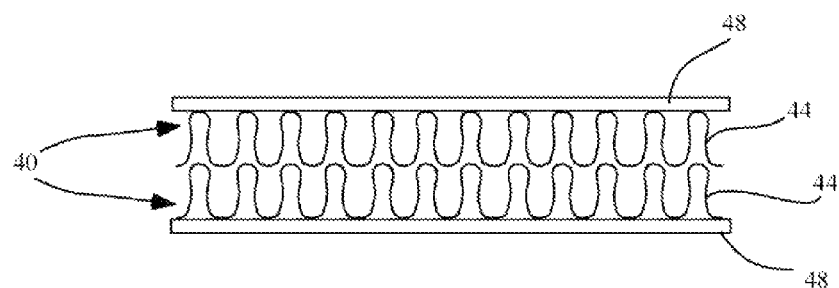
FIG. 5 is a front view of another embodiment of the disclosed geonet.

In alternate embodiments, the low aspect channel may be deeper than a preferred geonet material. In that case, one or more geonet mats may be laid on top of the other, such as shown in FIG. 5, where two geonet mats 40 are laid on top of one another, with the irregularly coiled stringy plastic structure 44 facing each other. In another embodiment, the geonet mats may be fabricated with a greater thickness, e.g., about 2 inches, about 3 inches or about 6 inches in thickness. In embodiments with thicker geonet mats, it may be practical to omit the dosing pipe and allow the wastewater to flow through the void space of the mat, from a low aspect channel end or selected injection points.

The aspect ratio of the low aspect channel 24 may be less than about 6/30 (6 units of height divided by 30 units of width, or about 0.2), preferably the aspect ratio will less than about 1/10 (1 unit of height divided by 10 unites of width, or about 0.1), and more preferably the aspect ratio will about 1/30 (1 unit of height divided by 30 unites of width, or about 0.033) to about 1/36 (1 unit of height divided by 36 unites of width, or about 0.028) or less. These ratios reflect only the dimensions of the channel 24, and not the dosing pipe 22. However, inasmuch as the preferred dosing pipe 22 is small in diameter and vertical dimension, the ratios are roughly applicable to the whole of the conduit as well.

In other embodiments, the low aspect channel 24 may be much wider than shown; and, it may comprise a continuous wide layer beneath the soil surface 30. Spaced channels 24 (also called laterals or branches), following the traditional leach field layout may be utilized in another embodiment.

In one embodiment, the perforated pipe 22. will be about 4 to 12 inches beneath the surface of the soil 30. Thus, in that embodiment, the bottom of the low aspect channel 24 will be about 5-17 inches deep, depending on the diameter of pipe 22 (if a pipe 22 is used in the embodiment). Thus, it is feasible in many soil areas to have the conduit wholly in the generally more permeable A-horizon of the soil. Since most wastewater will percolate downwardly into the soil beneath the low aspect channel 24, the wastewater will be better treated than if the bottom of the conduit was deeper. The soil nearer the surface has better chance of being maintained or restored to aerobic condition by natural diffusion processes within the soil. In another embodiment, there will only be one perforation in the pipe 22 about every 10 to 20 feet.

In another embodiment, pipe 22 may be inside the confines of low aspect channel 24. Solid distribution pipes with a manifold may be used with or without dosing pipes 22 to get relatively even water delivery to the channel 24. Typically dosing will be carried out with a pump and thus the pipe 22 need only be of small diameter, as previously indicated. Dosing may also be accomplished with a dosing siphon or an accumulator tank with an actuated valve. In another embodiment, dosing pipe 22 may be sandwiched between two channels 24, an upper channel and a lower channel. In another embodiment, when a dosing pipe is sandwiched between two layers, the top geonet layer may have an impermeable sheeting over it to serve to dissipate the water velocity. In still another embodiment, the pipe 22 may be located between 2 approximately horizontally parallel low aspect channels 24.

Figure 6:
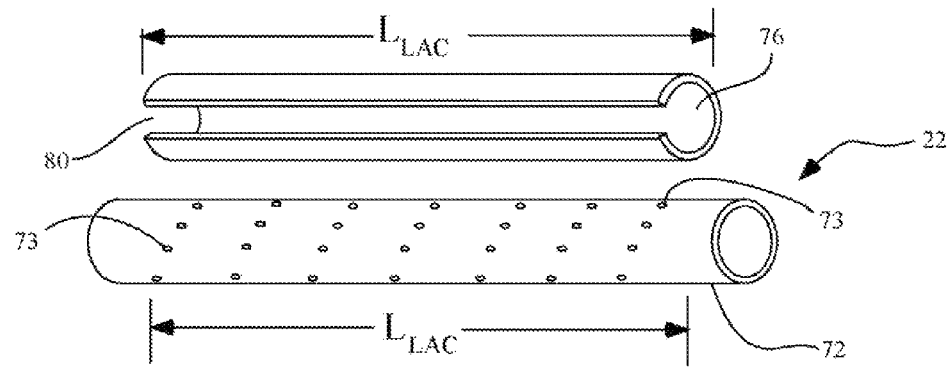
FIG. 6 is an exploded view of one embodiment of a dosing pipe.
Figure 7:
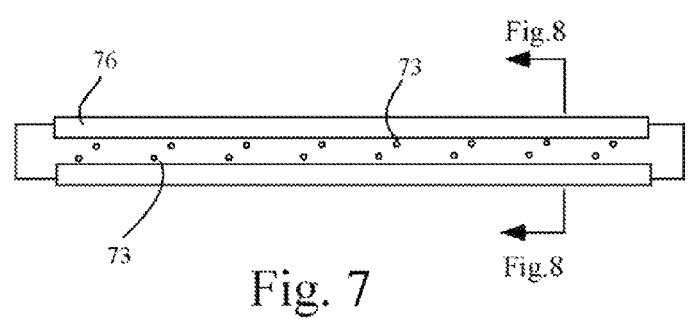
FIG. 7 is a side view of the dosing pipe of FIG. 6.
Figure 8:
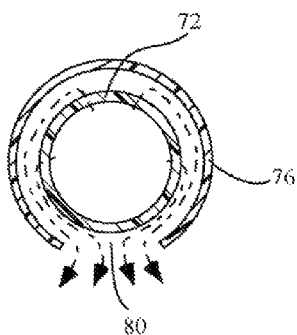
FIG. 8 is a cross-sectional view of the dosing pipe of FIG. 7.

FIG. 6 shows another embodiment of the perforated dosing pipe 22. In this embodiment, the dosing pipe comprises a perforated tube 72, perforations 73 in the tube 72, and a slotted sleeve 76. The perforations 73 of the tube 72 lay along a length of the pipe that is approximately equal to the length of the low aspect channel 24, that length is referred to as $L_{LAC}$. The sleeve length is also approximately equal to the length of the low aspect channel 24. In another embodiment, the slotted sleeve 76 may be relatively short segments located adjacent to a perforation on the tube 72. For instance, in an embodiment with one perforation about every 15 feet of tube 72, there may be a sleeve 76 of about 6 inches located adjacent to every perforation. FIG. 7 shows the sleeve 76 fitted over the tube 72. FIG. 8 shows a cross-sectional view through the tube 72 and sleeve 76 through plane A-A. The dotted arrows show possible paths for the water leaving the perforations, and traveling between the sleeve and the tube and exiting pipe 22 at the slotted area 80. This configuration of a perforated dosing pipe 22 is advantageous in that water will not spray out of the perforations and immediately impact the soil surrounding the conduit 20. This prevents erosion of the soil around the conduit 20. Thus, in this configuration, the dosing pipe 22, allows water to be directed only towards the low aspect channel 24, rather than to the surrounding soil. In this embodiment, a geotextile shroud 26 may be omitted, and a filler medium such as, but not limited to stone, pebble may be used to prevent soil from entering the geonet. It should be obvious to one of ordinary skill that the perforations 73, may comprise multiple perforations located along the length of the tube, or there may be only one perforation per tube 72, or one perforation 73 per a certain length of tube 72.

While dosing with a pump is preferred for uniformity of distribution, the pipe 22 may be configured to rely on gravity to distribute the wastewater. In such case a larger pipe, up to about 4 inches in diameter, may be used. In still another embodiment, for either a gravity or a pump system, the pipe 22 may be eliminated, and water may be delivered directly into one end of the channel 24, or into the middle of the channel 24.

Figure 9:
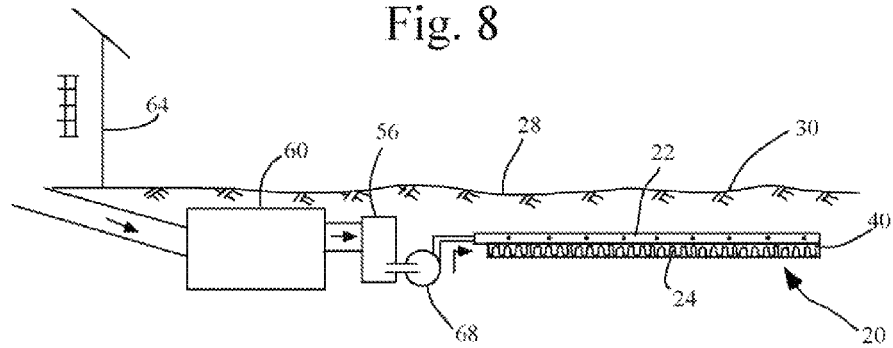
FIG. 9 is a schematic of a disclosed low aspect ratio wastewater treatment system.

The disclosed conduit 20 will provide less interior storage volume, or buffering void space, than prevalent prior art chambers or prior art stone filled trenches. Therefore, depending on the particular flow handling requirements, a water handling system may be used. For example, as illustrated by FIG. 9, a flow equalization tank 56 receives discharge from a processing vessel 60, such as a septic tank. Sewage flows from a discharge source 64 to the processing vessel 60. The discharge source 64 may be, but is not limited to: a residence or a business. Periodically, a dosing device, such as, but not limited to a pump 68 will flow water from the flow equalization tank 56 to the conduit 20 located in the subsurface leach field. The conduit 20 comprises a dosing pipe 22 and a low aspect channel 24. FIG. 6 shows one embodiment of a wastewater scheme. In other embodiments, the flow equalization tank 56 may be omitted, and the processing vessel 60 may be used for flow equalization. This may be facilitated through the use of a pump to control levels in the primary processing tank.

In use, the conduit 20 will be periodically dosed with wastewater according to the particular soil's hydraulic conductivity, preferably with loading rates of about 0.25 to about 3 inch per unit horizontal bottom surface area. Preferably, the time between dosing will about two times the time for a dose of water to percolate into the soil. It is conceived that that will better enable the low aspect channel 24 and recently-saturated soil near the low aspect channel to drain of water, and to refill with gas, which is in good part oxygen containing air, flowing downward through the soil and through the permeable top of the conduit. If air distribution pipes are connected to vents, the foregoing effect can be enhanced by suitable valving at the inlet end of the pipe or pipes, through the use of check valves on the vent lines, which valves will close when water is applied to the conduit. When the water percolates into the soil, it allows the check valve or similar functioning device to open and provide for the flow of air to replace an equal volume of water.

When using a low aspect channel 24 as described in this patent application, the vertical dimension (h) may be about one inch. A one-inch high low aspect channel will only hold one-inch depth of water. So, the ratio of volume to area is 1 to 1. This low ratio of volume to area arises from the present invention's low aspect ratio and is advantageous in that it prevents anaerobic conditions from developing such that a biomat layer is formed on the bottom surface of the channel 24. Therefore, smaller doses of anaerobic water and organisms enter the influence zone. The influence zone is that zone where waste water is largely renovated, or biochemically converted into a more environmentally benign form, prior to re-introduction into the ground water. This prevention of anaerobic conditions encourages a stable and sustainable aerobic microbial community to be present on a continuing basis thereby providing for greater treatment of the wastewater. This also results in a greater long term acceptance rate of wastewater at a greater percolation rate.

Thus for any given daily flow of water, the flow must be dosed out to the channel in an amount that does not overflow the conduit, that is, the amount of water must be no more than the volume containable by the conduit at any one time. For instance, if the conduit has 4 rows of 20 foot channels, that are each 1 inch high and 10 inches wide, and the conduit is filled either with a geonet or other medium thereby allowing a void space of about 95%, then the total instant capacity for that conduit is given by the following:

20 feet(length)×12 inches/foot×1 inch(h)×10 inches (w)×4 rows×95%=9120 in$^3$.

Thus, wastewater from the source 64 should be dosed out in increments of no more than about 9120 in$^3$ at a time, to prevent over-flowing of the channel 24. If the conduit appears to be overflowing, despite limiting the increment of water to a proper amount, then this may be an indication that there is a malfunction such as, but not limited to a blockage in the system.

In one embodiment of the disclosed conduit, the height of low aspect channel is about 3 inches or less, and preferably about 1 inch or less. Correspondingly, the ratio of volume to bottom surface area is about 3 to 1 and less, preferably about 1 to 1 and less.

Figure 10:
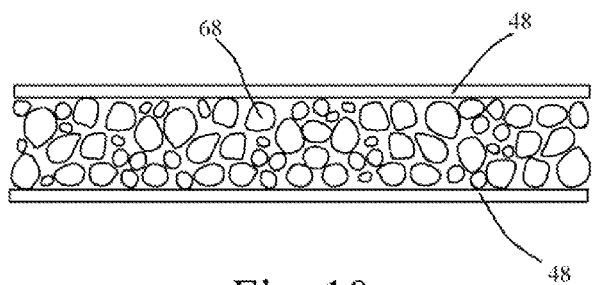
FIG. 10 is a cross-sectional view of a disclosed alternative to a geonet.
Figure 11:
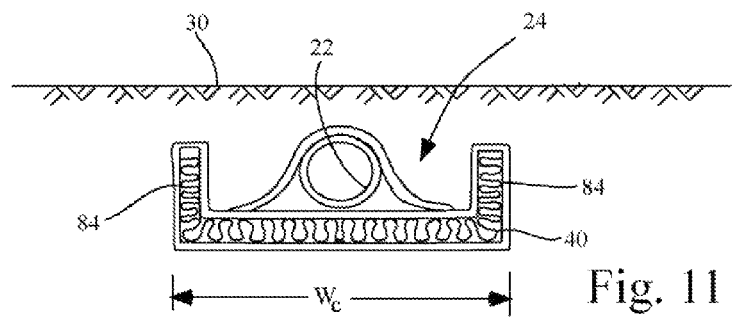
FIG. 11 is another embodiment of the disclosed leaching conduit.

Other plastic products which function similarly to a geonet may be used, so long as there is a substantial void between top and bottom layers. For example, a molded plastic three dimensional grid may be used. FIG. 10 shows another alternative. The geonet may be replaced by granular media 68, such as crushed stone or pea stone, captured between two layers of air and water permeable sheeting 48, such as a geotextile. In another alternative, polystyrene aggregate incorporated into suitable netting or blanket may be used. For example, the type of polystyrene aggregate associated with the commercial product EZflow Drainage Systems may be used. EZflow drainage systems are manufactured by RING Industrial Group, LP, 65 Industrial Park, Oakland, Tenn. 38060. When soil conditions are favorable, and there is not a great risk of upwardly moving fine grained material from the underlying soil, it might be acceptable to eliminate the bottom geotextile layer in any embodiment of the invention. In addition the geonet may be replaced by a granular media 68 that is not captured between two layers. The granular media may include, but is not limited to: crushed stone, pea stone, crushed glass, ground rubber, tire chips, and round stone FIG. 11 shows another embodiment of the disclosed conduit. In this embodiment, the low aspect channel 24 has a width $w_c$. However, the geonet 40 has a width that is greater than $w_c$, such that when the geonet 40 is placed in the channel 24, two sides 84 of the geonet 40 bend up or down along the sides of the channel 24. After the channel 24 is dug, and the geonet 40 is placed in the channel, then a perforated dosing pipe 22 may be located on top of the geonet 40, with a geotextile shroud 26 over the pipe 22. Then, soil is filled in to the soil surface 30. In this embodiment, the channel 24 is no longer mostly rectangular shaped in cross-section, but is approximately "U" shaped in cross-section.

Figure 12:
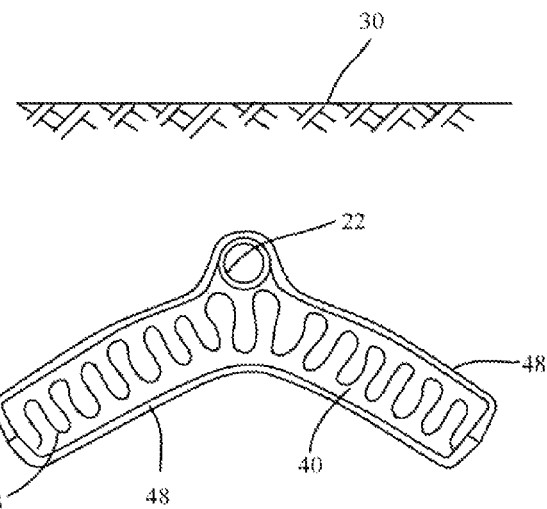
FIG. 12 is another embodiment of the disclosed leaching conduit.

FIG. 12 shows another embodiment of the disclosed conduit. In this embodiment, the low aspect channel 88 may be curved as shown. An air and water permeable sheeting 48, such as a geotextile material, may be located on the boundaries of the channel 88 and around the dosing pipe 22. The conduit may have a geonet located within it.

While it is an advantage to be able to put the conduit of the invention near the surface 30 and atmospheric oxygen, in some climates freezing of the soil and water in the conduit could be a risk. There is the obvious choice to install the system deeper. Another choice, which also may involve compromise with respect to vertical gas interchange, is to place an insulation layer within the soil, above the conduit. For instance, a cellular plastic insulation board can be installed. The board may inhibit the desired vertical gas interchange, so it may be provided selectively with through holes, to enable soil gas flow. More preferably, the insulation will be air permeable media which nonetheless provides better insulation that soil. For instance, pellets of plastic or perlite may be provided, as well as polystyrene aggregate, mentioned above. If the conduit is comprised of closed cell aggregate, and not a geonet, then the aggregate itself will provide the conduit with self-insulation, which will inhibit the cooling and freezing, at least in the bottom portion. A blower can also be utilized to provide for increased drainage during subfreezing conditions.

A geogrid is typically a product that is used to stabilize soil to vehicle loads, etc and is typically a square mesh that gets buried above the strata requiring stabilization. The disclosed low aspect ratio conduit may have a geogrid installed between the conduit and the soil surface to protect the conduit from wheel loads.

The disclosed leaching system is more likely to have aerobic conditions due to its low aspect ratio and its low maximum volume to bottom surface ratio of the conduit, thus leading to better processing of the wastewater. The disclosed system also provides for wastewater processing near the soil surface, which provides for greater access to oxygen and a greater likelihood of aerobic conditions for the processing. Furthermore, as septic fill becomes increasingly scarce and more expensive, the low aspect ratio leaching conduit minimizes the need and quantity of fill required. Additionally, air may be flowed through the conduit to optimize aerobic conditions.

High Aspect Ratio Conduit

Figure 13:
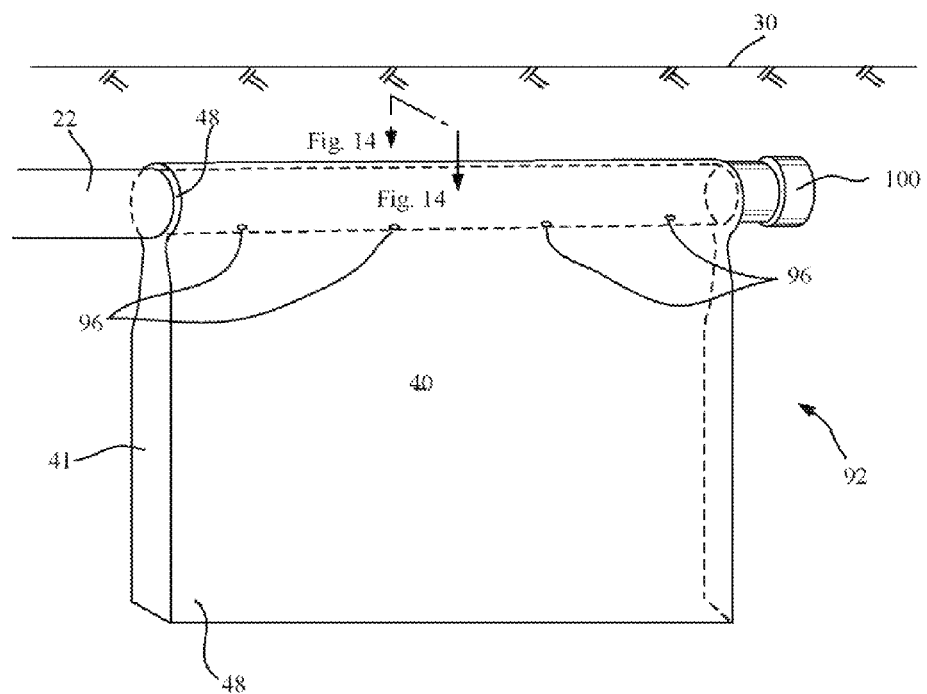
FIG. 13 is a perspective view of a disclosed high aspect conduit.

On occasion there may not be enough space to install a low aspect ratio wastewater system as described above. Therefore, this application discloses a low aspect ratio wastewater system that may be thought of as being turned on its side, thereby creating a high aspect ratio conduit, wherein the void space is relatively small, and the top of the conduit is relatively close to the surface 30 ground. Referring to FIG. 13, an embodiment of a high aspect conduit 92 is shown. A perforated dosing pipe 22 is shown under a ground surface 30. The perforations 96 are shown located intermittently on the dosing pipe. The dosing pipe 22 is shown with a cap 100 on one end. An air and water permeable sheeting 48 encloses a portion of the perforated dosing pipe 22. The generally rectangular volume beneath the dosing pipe 22, also enclosed by the air permeable sheeting 48, contains a geonet 40. The generally rectangular shaped volume 41 is also know as the channel of the conduit 92. That is the conduit 92 comprises a channel 41 where wastewater flows through, and gas infiltrates into. Additionally, since the conduit 92 has a high aspect ratio, then the channel 41 also has a high aspect ratio. It should be noted that wherever in this patent application a geonet is referenced, that geonet may be replaced by a granular material. The dosing pipe 22 is configured to deliver fluid via the perforations 96 down into the geonet 40.

Figure 14:
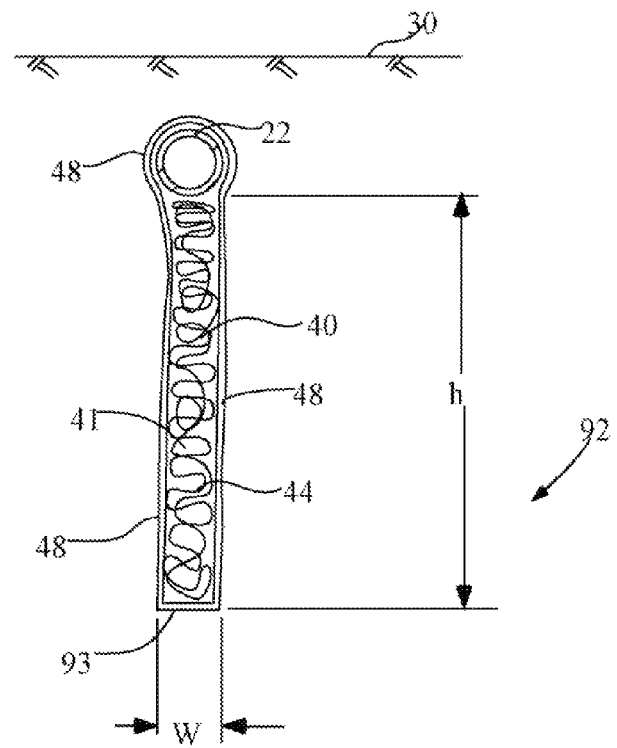
FIG. 14 is a cross-sectional view of the disclosed high aspect conduit from FIG. 13.

FIG. 14 shows a cross-sectional view of the conduit 92. The dosing pipe 22 is surrounded by an air permeable sheeting 48. Additionally, in this view, the irregularly coiled stringy structure 44 of the geonet 40 can be seen under the dosing pipe 22, and surrounded by the air and water permeable sheeting 48. The height "h" of the channel 41 is shown in FIG. 14, and the width "w" of the conduit is also shown. The aspect ratio is given by:

$$\text{Aspect Ratio} = h \div w \qquad \text{Eq. 1}$$

Thus it can be seen that the aspect ratio for this disclosed conduit 92 is much higher than the conduit shown in FIG. 1. However, this disclosed conduit 92 will take up less land surface area (acreage) than a low aspect ratio conduit configured to treat generally the same amount of fluid and thus will be useful when surface area is not readily available. In some embodiments, the width of the conduit is about 3 inches or less, and more particularly between about 0.5 and 2 inches wide. The height of the conduit is between about 48 inches and about 6 inches, and more particularly about 12 to about 40 inches. Thus, in this document a high aspect ratio will be about 96 to about 3, and more particularly between about 80 and 6. In other embodiments, the high aspect channels may be "Z" shaped for additional surface area. The bottom surface area of the conduit is relatively small when compared to the sides of the conduit. The heavier sludge may settle to the bottom of the conduit and leave the sides relatively free of blockages, thereby allowing for a greater infiltration along the side of the conduit as compared to the bottom of the conduit. Additionally, the sides of the conduit have more oxygen since they are closer to the surface.

Figure 15:
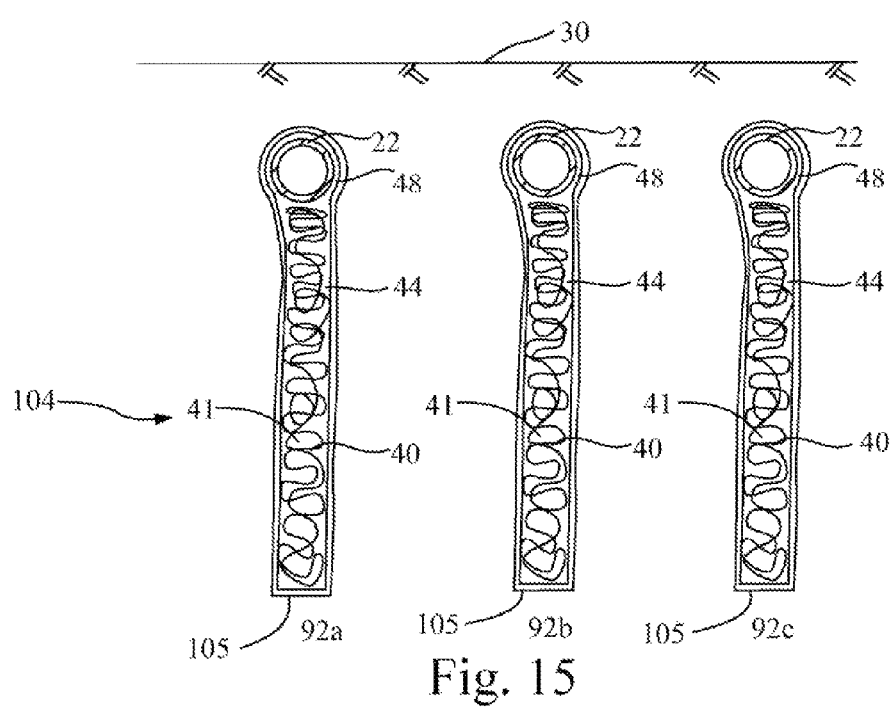
FIG. 15 is a cross-sectional view of another embodiment of the disclosed high aspect conduit.

FIG. 15 shows a cross-sectional view of a another embodiment of the disclosed high aspect conduit 104. In this conduit 104 there are a plurality of perforated dosing pipes 22, each wrapped in a air and water permeable sheeting 48. Additionally, each dosing pipe has a generally rectangular volume beneath each dosing pipe 48. Each generally rectangular volume contains a geonet 40. The irregularly coiled stringy structure 44 that makes up the geonet 40 is shown in this view. Each geonet 40 is enclosed in an air and water permeable sheeting 48. Each dosing pipe 22 is configured to deliver fluid via perforations 96 (not seen in this view) into the geonet 40. FIG. 15 shows three dosing pipes 22, however, other embodiments may have as few as 1 dosing pipe and up to as many dosing pipes as practical in a given area of land. The high aspect conduits 92, 104 disclosed in FIG. 14 and FIG. 15 could be alternatively constructed by installing a dosing pipe 22, with a geonet 44 wrapped around the pipe 22, in the center of an air and water permeable sheeting 48 that is about 2 feet wide and folding the sheeting in half about the pipe. A difference in this alternative is that the core material would be wrapped around the pipe too. Also, the bottom 93 of the high aspect conduits 92 and the bottoms 105 of the high aspect conduits 104 may be constructed without an air and water permeable sheeting 48, that is the bottoms 93, 105 may be open to the surrounding soil. All the channels 41 can also be made of crushed stone, or plastic pieces or other granular or permeable media in substitution for the "geonet".

Figure 16:
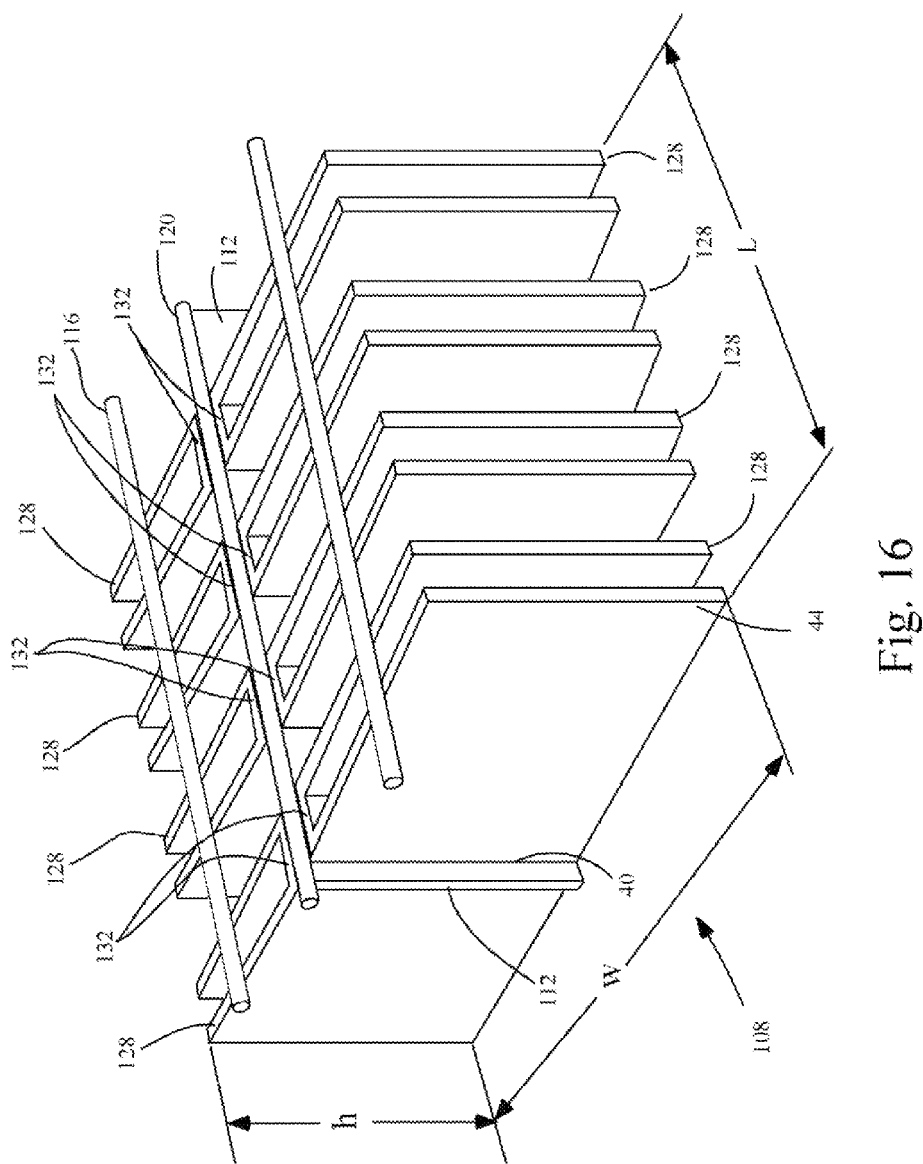
FIG. 16 is a perspective view of another embodiment of the disclosed high aspect conduit.

FIG. 16 shows a perspective view of another embodiment of a disclosed high aspect conduit 108. In this embodiment, three perforated dosing pipes 116, 120, 124 are shown, however it should be understood that fewer or more dosing pipes may be used as necessary to properly treat an amount of wastewater. Beneath the center dosing pipe 120, is a generally rectangular volume 112 of geonet 40. This volume 112 generally extends and runs along a plane that is collinear to the center dosing pipe 120. A volume of 128 of geonet 40 is located under dosing pipe 116 and is partially adjacent to the geonet volume 112. The geonet volume 128 may be thought of as a generally rectangular volume formed into a "U" shape, with the bottom of the "U" 132 being adjacent to the volume 112 of geonet. There are a plurality of geonet volumes 128 located under the dosing pipe 116. Similarly, there are plurality of "U" shaped volumes 128 of geonet located under the dosing pipe 124, with each volume 128 having the bottom of the "U" 132 located adjacent to the geonet volume 112. The irregularly coiled stringy structure 44 that make up the geonet 40 are not shown in this Figure in order to simplify the Figure for better understanding. The dosing pipe 116 is configured to deliver fluid to each of the geonet volumes 128 located beneath it via perforations configured to line up with each geonet volume 128. Similarly the dosing pipe 124 is configured to deliver fluid to each of the geonet volumes 128 located beneath it via perforations configured to line up with each geonet volume 128. The dosing pipe 120 is configured to deliver fluid to the geonet volume 112. Additionally, each of the dosing pipes 116, 120, 124 are covered with an air and water permeable sheeting (not shown in this view for ease of understanding), and each of the geonet volumes 112, and 128 are enclosed in an air and water permeable sheeting (not shown in this view for ease of understanding). In one embodiment, the width (w) of the conduit 108 may be about 3 feet, and length (l) of the channel may be about 8 feet, and the height (h) of the channel may be about 1 foot. It should be noted that the figures are not necessarily proportional or to scale. The conduit may be modified to be up to 5 feet in height (h), 10 feet wide (w), and of unlimited length (l). In another embodiment, the dosing pipes 116, 120, 124 may be replaced with a low aspect ratio conduit 20, comprising a low aspect ratio channel 24, with the low aspect ratio channel 24 adjacent to each of the "U" shaped geonet volumes 128. Thus water may be applied to the dosing pipe 22, and the low aspect ratio channel 24 would provide fluid communication to all the "U" shaped geonet volumes 128. Additionally, in another embodiment, the "U" shaped volumes may be constructed out of pieces about half as long, that simply lay adjacent to the geonet 40. The conduit 108 comprises channels that are coincident with the "U" shaped volumes 128 and rectangular volume 112.

Figure 17:
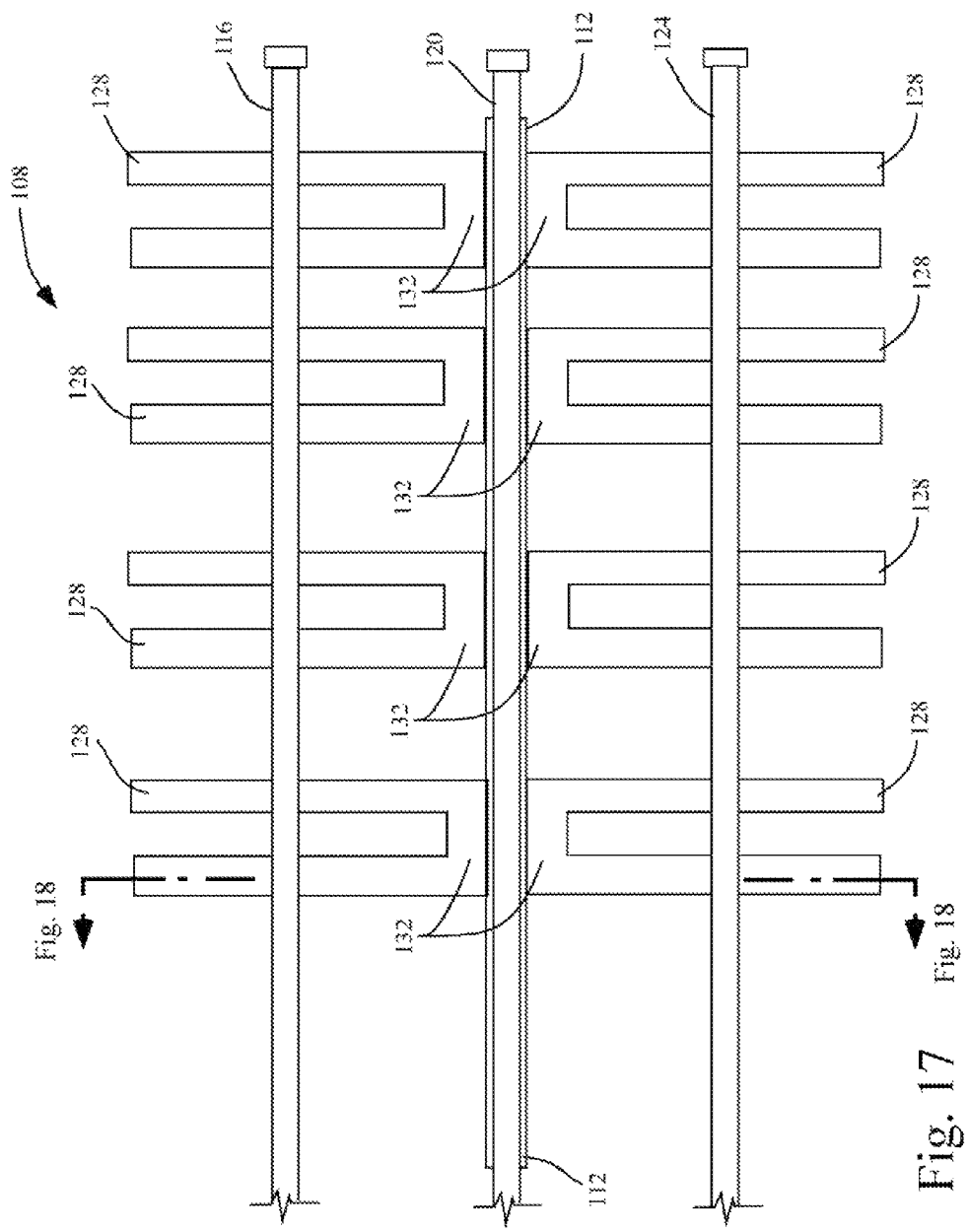
FIG. 17 is a top view of the disclosed high aspect conduit from FIG. 16.

FIG. 17 shows a top view of the high aspect conduit 108 from FIG. 16. The irregularly coiled stringy structures 44 that make up the geonet 40 are not shown in this Figure in order to simplify the Figure for better understanding. Additionally, each of the dosing pipes 116, 120, 124 are covered with an air and water permeable sheeting (not shown in this view for ease of understanding), and each of the geonet volumes 112, and 128 are enclosed in an air and water permeable sheeting (not shown in this view for ease of understanding).

Figure 18:
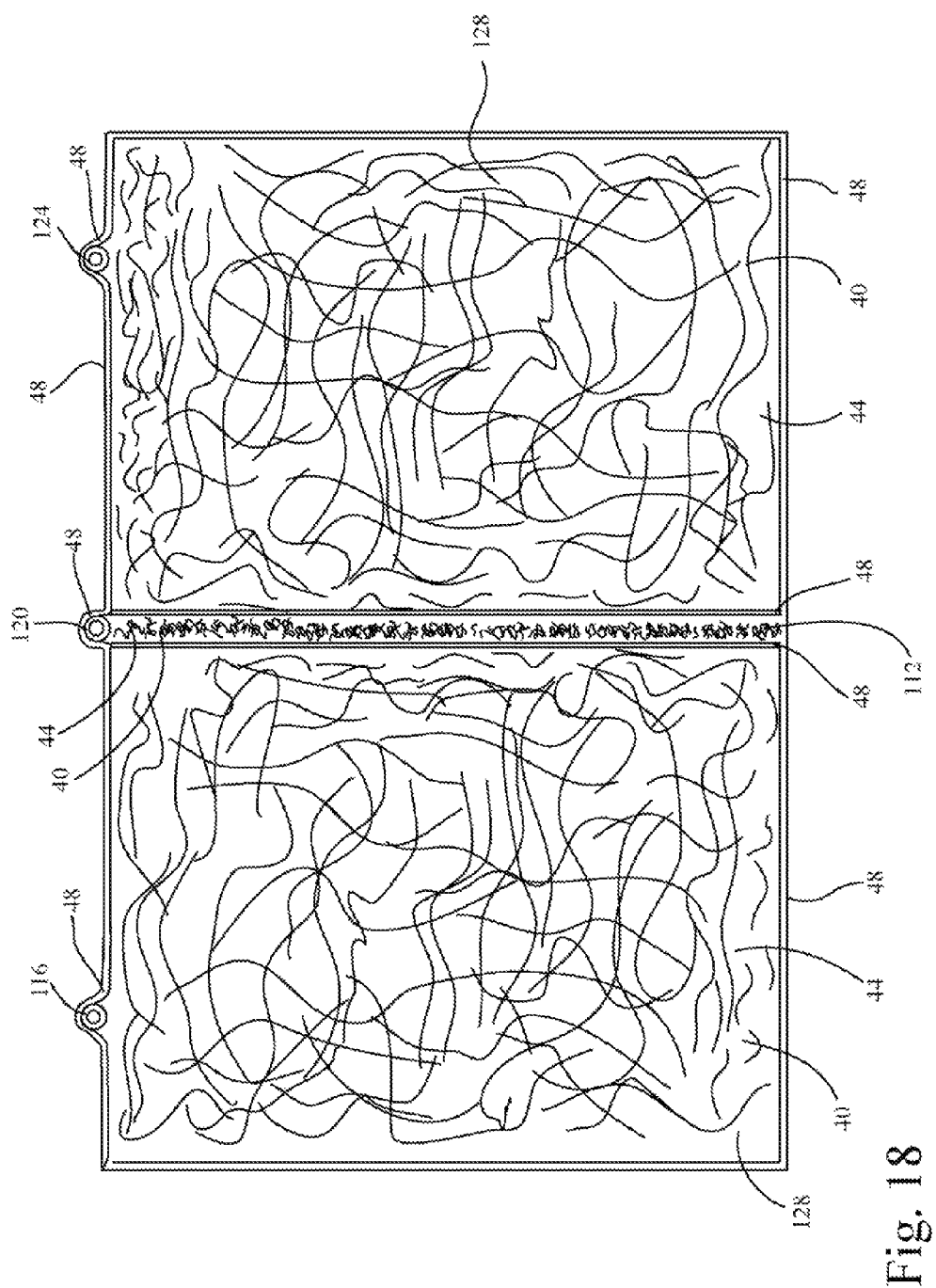
FIG. 18 is a cross-sectional view of the high aspect conduit from FIG. 16.

FIG. 18 is a front cross-sectional view of the conduit 108 from FIGS. 16 and 17, through the plane B-B (shown in FIG. 17). In this view, each of the perforated dosing pipes 116, 120, 124 are shown wrapped in an air and water permeable sheeting 48. The generally rectangular volume 112 is shown with the irregularly coiled stringy structure 44 that makes up the geonet 40. The "U" shaped volumes 128 are shown also with the shown with the irregularly coiled stringy structure 44 that makes up the geonet 40 visible. The volumes 112, 128, are enclosed in an air and water permeable sheeting 48.

The wastewater conduits shown in FIGS. 13-18 may be easily installed if a roll of geonet is used. Geonet is often sold in rolls of various sizes, from about half a foot in width, and about half an inch in thickness, and up to lengths of about 450 feet or more. Thus, one method of installing a wastewater conduit as shown in FIG. 13, is to obtain a geonet of about one inch in thickness, and about 1 foot in width, and about 8 feet in length. The 8 foot geonet is covered in an air permeable sheeting on all sides except for the top of the geonet which will be adjacent to a perforated dosing pipe. An 8 foot in length dosing pipe of about 1" outer diameter may then be attached to the 8 foot geonet by wrapping the pipe with an air permeable sheeting and attaching that air permeable sheeting to the sheeting around the geonet. A trench may be dug about 8-12 inches deep and 8 feet long and about 2 inches wide. The dosing pipe and geonet may then be placed in trench and the trench filled in with soil, sand, or what ever material is suitable. The dosing pipe may then be coupled to the outflow of wastewater from the residence or business. Conduits may also be about 12 inches high by about 1 inch wide, with length varying depending on the size of land available. It should be noted that "U" shaped volumes may be easily formed by simply bending the geonet into the desired shape.

The dosing pipe 22 may be configured to allow fluid such as waste water to flow into the geonet in a manner similar to that described in U.S. Pat. No. 6,959,882 issued on Nov. 1, 2005 to David A. Potts and entitled "Watering and aerating soil with a drip line", wherein instead of flowing the fluid into soil, the fluid is flowed into the geonet. U.S. Pat. No. 6,959,882 is fully incorporated in its entirety by reference herein.

Figure 19:
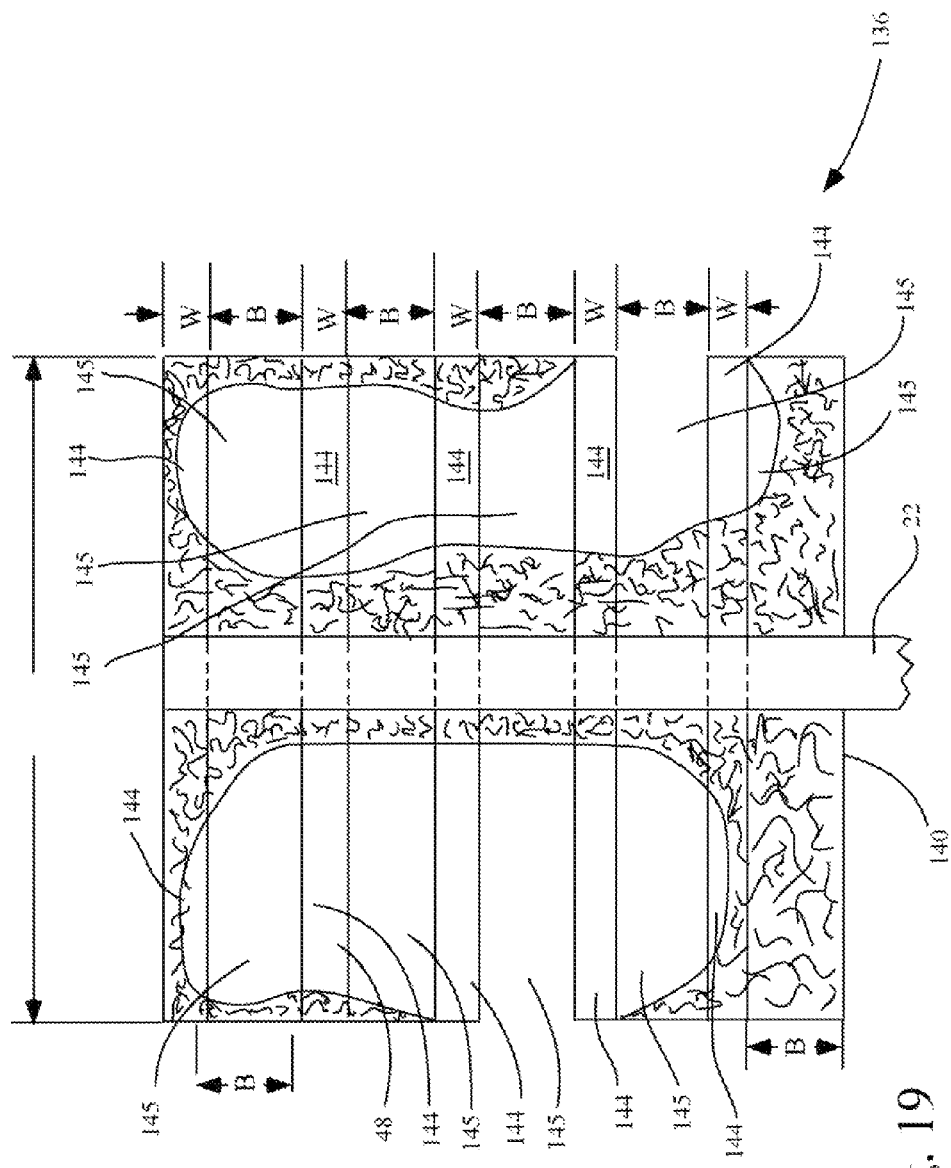
FIG. 19 is a top view of another embodiment of the high aspect conduit.
Figure 20:
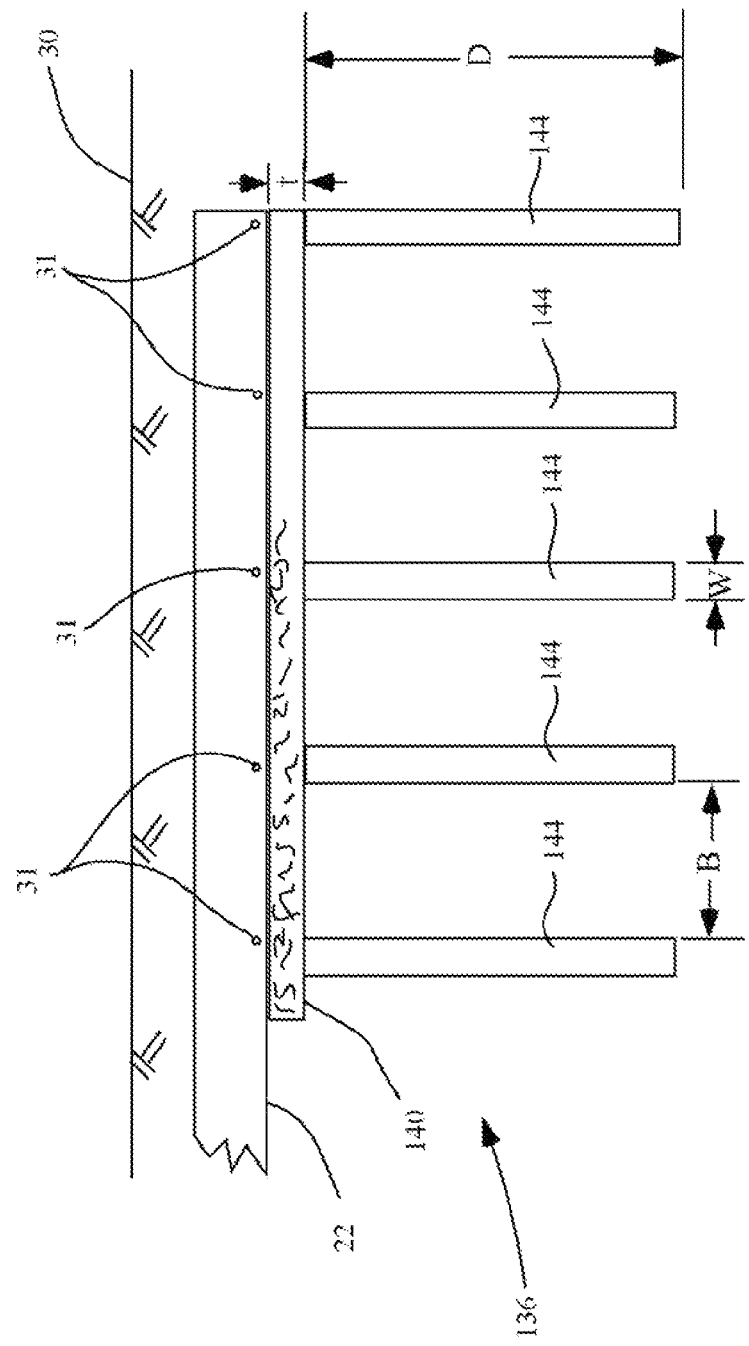
FIG. 20 is a side view of the high aspect conduit from FIG. 19.

FIG. 19 is a top view of the disclosed high aspect ratio conduit 136. This high aspect ratio conduit 136 comprises a perforated dosing pipe 22, a geonet layer 140 laying below and in fluid communication with the pipe 22. The geonet layer 140 comprises a geonet 40 that is about 4 inches in thickness "t", as shown in FIG. 20. It should be noted that in other embodiments, the geonet layer 140 may be replaced with pea stone, crushed stone, plastic pieces or other granular or permeable media. Laying below the geonet layer 140 are a plurality of geonet volumes 144. Each geonet volume 144 comprises a volume of geonet 40 enclosed in an air and water permeable sheeting 48. Please note that the coiled stringy structures of the geonet 40 are not visible due to the air and water permeable sheeting 48. The geonet layer 140 is shown partially cut-away to reveal the geonet volumes 144 below. The width "w" of each geonet volume may be about 1 inch. The distance "B" between each geonet volume may be about 2 inches and up to about 10 feet or more apart. In this embodiment the dosing pipe may have internal diameter of about 4 inches. The depth "D" of each geonet volume 144 may be about 12 inches, see FIG. 20.

FIG. 20 shows a side view of the disclosed high aspect ratio conduit 136. The thickness "t" of the geonet layer 140, the depth "D" of each geonet volume is shown, the width "w" of each geonet volume, and the distance "D" between each geonet volume 140 are all shown. The perforations 30 in the dosing pipe 22 may be generally aligned with the geonet volumes 144. However in other embodiments, the perforations 30 need not be aligned with the geonet volumes 144.

Figure 21:
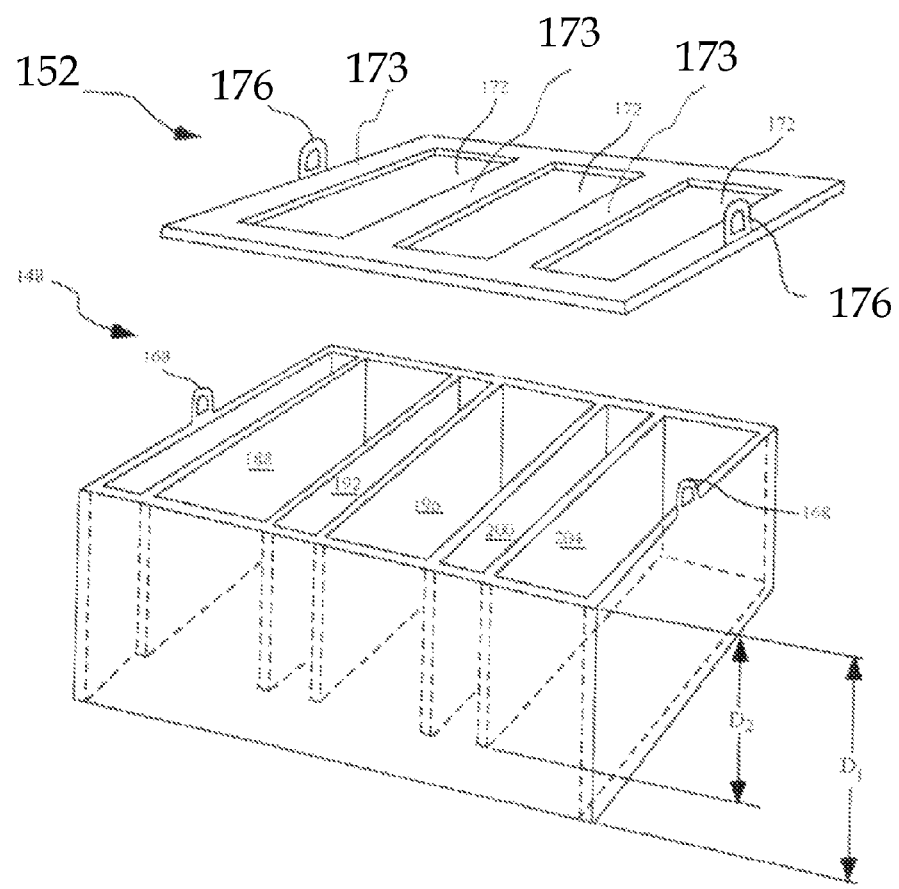
FIG. 21 is a perspective view of a high aspect conduit form and cover.

FIG. 21 is a perspective view of a conduit form 148 and conduit form cover 152. The conduit form 148 is configured to help install a high aspect ratio conduit 136 easily and quickly in the ground. With certain soils, such as cohesive soils, simple trenching equipment may be sufficient. The top and bottom 156 of the conduit form 152 are open. FIG. 22 is top view of the form 148, and FIG. 23 is a side view of the form 148. Referring now to FIG. 22, a volume 161 is defined by first endwall 180, a front wall 220, a rear wall 216, a first interior wall 188, an imaginary plane 184 through the an through the top surface of the form 148, and an imaginary plane 212 through the bottom of the interior walls 188, 192, 196, 200, and 204. A volume 162 is defined by interior wall 192, the front wall 220, the rear wall 216, an interior wall 196, the imaginary plane 184 through the top surface of the form 148, and the imaginary plane 212 through the bottom of the interior walls 188, 192, 196, 200, and 204. A volume 163 is defined by interior wall 200, the front wall 220, the rear wall 216, the interior wall 204, the imaginary plane 184 through the top surface of the form 148, and the imaginary plane 212 through the bottom of the interior walls 188, 192, 196, 200, and 204. Volumes 161, 162, 163 are each configured to contain a geonet volume 140. A volume 165 is defined by the interior wall 188, the front wall 220, the rear wall 216, the interior wall 192, the imaginary plane 184 through the top surface of the form 148, and an imaginary plane 216 through the bottom surface 217 of the form 148. A volume 166 is defined by the interior wall 196, the front wall 220, the rear wall 216, the interior wall 200, the imaginary plane 184 through the top surface of the form 148, and the imaginary plane 216 through the bottom surface 217 of the form 148. A volume 167 is defined by the interior wall 204, the front wall 220, the rear wall 216, and a second end wall 208, the imaginary plane 184 through the top surface of the form 148, and the imaginary plane 216 through the bottom surface 217 of the form 148. The volumes 165, 166, and 167 are configured to hold the soil or sand or any other suitable granular material that will occupy the volumes between the geonet volumes 140. It should be noted that the geonet can be substituted with other granular material and placed in volume 165, 166 and 167. In one embodiment, the height "$D_1$" of the volumes 165, 166 and 167 is greater than the height "$D_2$" of the volumes 161, 162, and 163. The form 148 may have a plurality of lifting members 168. The lifting members may be lifting hoops as shown in FIG. 21, or any other lifting mechanism configured to allow one to lift the form 148 out of the ground. The volumes 161, 162, and 163 have a width that is generally "w", which is generally the same as the width of each geonet volume described with respect to FIGS. 19 and 20. Similarly, the volumes 165, 166, and 167 have a width that is. generally "B, which is generally the same as the width of the granular material, such as soil or sand, which occupies the volumes between the geonet volumes 144. The volumes 165, 166, 167 between the geonet volumes will be referred to herein as granular volumes. Additional forms and trench shoring devices can be utilized to maintain the integrity of the excavation and to place additional sand, soil or media around the form. In other embodiments of the disclosed forms, $D_1$ may be about equal to $D_2$, and the interior walls 188,192,196, 200, 204 may extend to the imaginary plane 216. The form has a plurality of interior walls, 188, 192, 196, 200, 204, and for exterior walls: the first end wall 180, the front wall 220, the rear wall 216, and the second end wall 208. The form may be used without a cover in some instances.

The disclosed may comprise several pieces that are welded or otherwise permanently attached to each other in order to make one form. However, in another embodiment, the form may comprise several pieces (e.g. the walls) that may be fitted together using a tongue and groove attaching means, or other interlocking mechanisms. In this embodiment, the forms can may be easily transported as a stack of flat walls, and fitted together at the job site.

Referring back to FIG. 21, the form cover 152 has openings 172 configured to lie directly over the volumes 165, 166 and 167. The form cover 152 also has covered portions 173 configured to lie over the volumes 161, 162 and 163. Additionally, the form cover 152 has a plurality of lifting members 176. The lifting members may be lifting hoops as shown in FIG. 21, or any other lifting mechanism configured to allow one to lift the form cover 152 off of the form 148.

One method of using the form 148 and cover 152 to make a high aspect ratio conduit is as follows: dig a trench in the ground that can accommodate the form 148 and cover 152, fill the volumes 165, 166, and 167 with soil, or sand. Once filled, remove the cover 152, fill the openings volumes 161, 162 and 163 with a geonet. Finally, remove the form 148. At this point, a geonet layer 140 is placed on top of the geonet volumes and the sand/soil volumes. Next a perforated dosing pipe 22 is laid on top of the geonet layer 140 and covered with a geotextile fabric or other material. In another embodiment the dosing pipe may be placed so that a portion of the dosing pipe lies within the geonet volumes and the sand/soil volumes. Then, a layer of soil or sand is placed over the high aspect ratio conduit. Although three volumes 161, 162, 163 and three granular volumes 165, 166, 167 are shown, more or fewer volumes may be used depending on how many geonet volumes 144 and granular volumes are needed for a particular high aspect ratio conduit. Of course, the form cover 152 will be configured to have openings 172 corresponding to the granular volumes. The form cover may also incorporate a funnel, hopper, etc. into the device to improve construction efficiencies.

Figure 25:
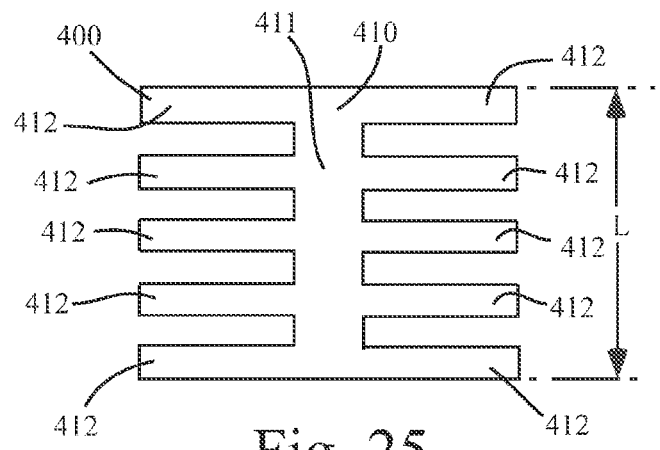
FIG. 25 is a top view of a multiple I embodiment of the disclosed form.
Figure 26:
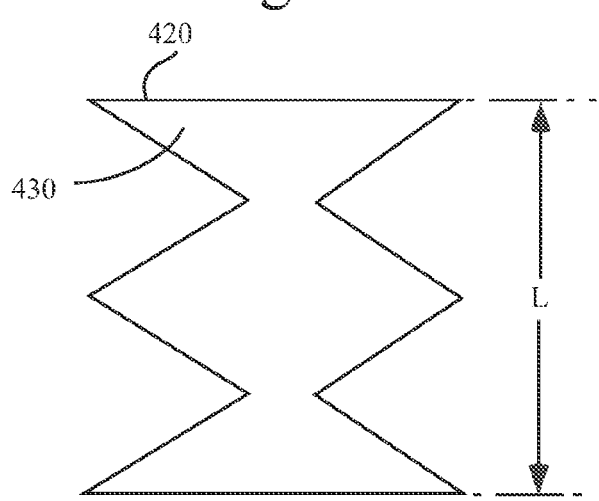
FIG. 26 is a top view of an accordion embodiment of the disclosed form.
Figure 27:
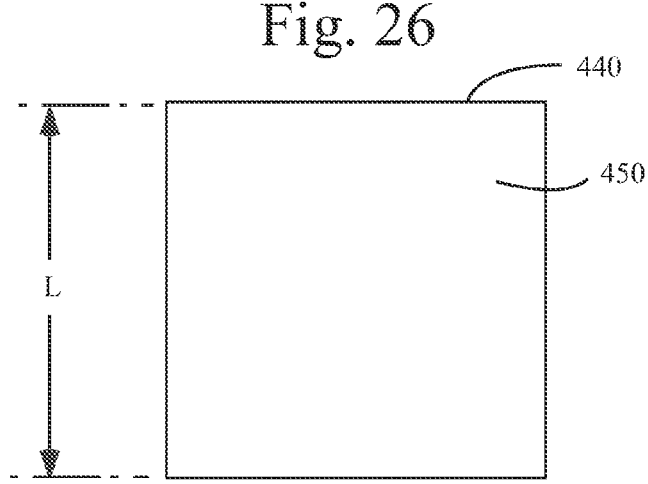
FIG. 27 is a top view of a box embodiment of the disclosed form.

FIGS. 25 through 27 show top views of three different form shapes, each of which has an open top and open bottom. FIG. 25 shows a form 400. The form 400 is empty in the interior 410, to allow the form to be filled with the desired aggregate material. Aggregate material may include, but is not limited to: man made granular material, naturally occurring granular material, and geonet. This form may be referred to a repeating "I" form, due the form appearing to be repeating letter I's standing on each other (or it may be referred to as repeating sideways U shapes). The interior 410 may be referred to as a geonet volume. The geonet volume 410 may comprise a central volume 411 with fingers 412 extending generally perpendicularly from the central volume. FIG. 26 shows a form 420. The form 420 is also empty in the interior 430, to allow the form to be filled with the desired aggregate material. This form 420 may be referred to as an accordion shaped form. The interior 430 may be referred to as a geonet volume. FIG. 27 shows a form 440. The form 440 is empty in the interior 450, to allow the form to be filled with the desired aggregate material. The interior 450 may be referred to as a geonet volume. This form 440 may be referred to as a box shape form. The forms have a length L. The length L may vary from 4 feet to 10 long in some preferred embodiments. In other uses, the forms may be even longer. The height of the forms (the dimension that goes into the paper that FIGS. 6-8 are shown on) may vary from 12 inches to about 6 feet tall for some preferred embodiments. In other uses, the height may be even greater than 6 feet. These forms 410, 420, 440 may have form covers that will cover the interior of each of the forms 410, 420, 440. The forms may also have a lifting means attached to each of them. The form covers will allow one to dig a trench, place form with a cover into the trench, backfill the trench, thus surround the form with backfill, but since the cover is on the form, no backfill will enter the interior of the form. Once the trench is backfilled, the cover can be removed, and a geonet can be inserted into the form interior. Then, the form can be removed from the trench.

The disclosed form allows one to maximize the infiltrative surface area of leach fields, without utilizing materials that compromise the hydraulic conductivity of the leaching system. This is accomplished with the use of a rigid form made of steel, aluminum, plastic, wood, etc. Steel is especially good. After an excavation is dug, a form is placed into the trench. The native soil or specified sand, etc. is backfilled and compacted to the specified values outside the form. Then the desired aggregate, typically gravel, crushed stone, tire chips, etc. is placed inside the form. Specially designed funnels and covers can also be utilized as shown in FIG. 21 (showing the cover). Once the form is filled to the desired level (varying heights equates to different treatment capacities, separation from groundwater, etc.) the form is pulled out of the ground, typically using excavation equipment. In certain cases vibrating or shaking the form is desirable. This can be achieved by simply banging on the side of the form with a hammer or with a mechanical vibrator, such as is used on dump truck bodies. This vibration also helps to minimize settling of the materials used in construction the leach field lateral line. Once the form is pulled out, a wastewater distribution pipe (such as, but not limited to a perforated pipe) may placed on top or connected within to the leach field. In some cases multiple forms that interlock with tong and groove type joints are utilized to advance a longer leach field lateral line as is shown in my high aspect ration system. In addition to having a form interlock with one or more other forms, the forms may comprise separatable walls that may attach via a tongue and groove attaching means in order to make the form. If one form is being used, a shoring board may be utilized to shore up the construction materials from falling, or slumping into the excavation when the form is pulled out and moved ahead. Forms may also be utilized that butt together. Steel is a desirable construction material for these forms due to the high strength and weight, which helps prevent the form from moving when being filled inside and around the perimeter. It should be obvious to one of ordinary skill in the art, that the form must be strong enough to withstand the weight of the backfill during the installation process.

Thus, the use of a form allows one to keep different materials separate, as is desirable when constructing a leach field and or trench systems in elevated sand mounds. An example would be a rectangular form to keep a discrete interface between sand and stone. This is often problematic when constructing a system in a select fill (often sand) material. The form allows trench walls that are at a 90 degree angle, as opposed to walls that match the angle of repose of the sand in which the gravel lateral is being constructed.

Figure 28:
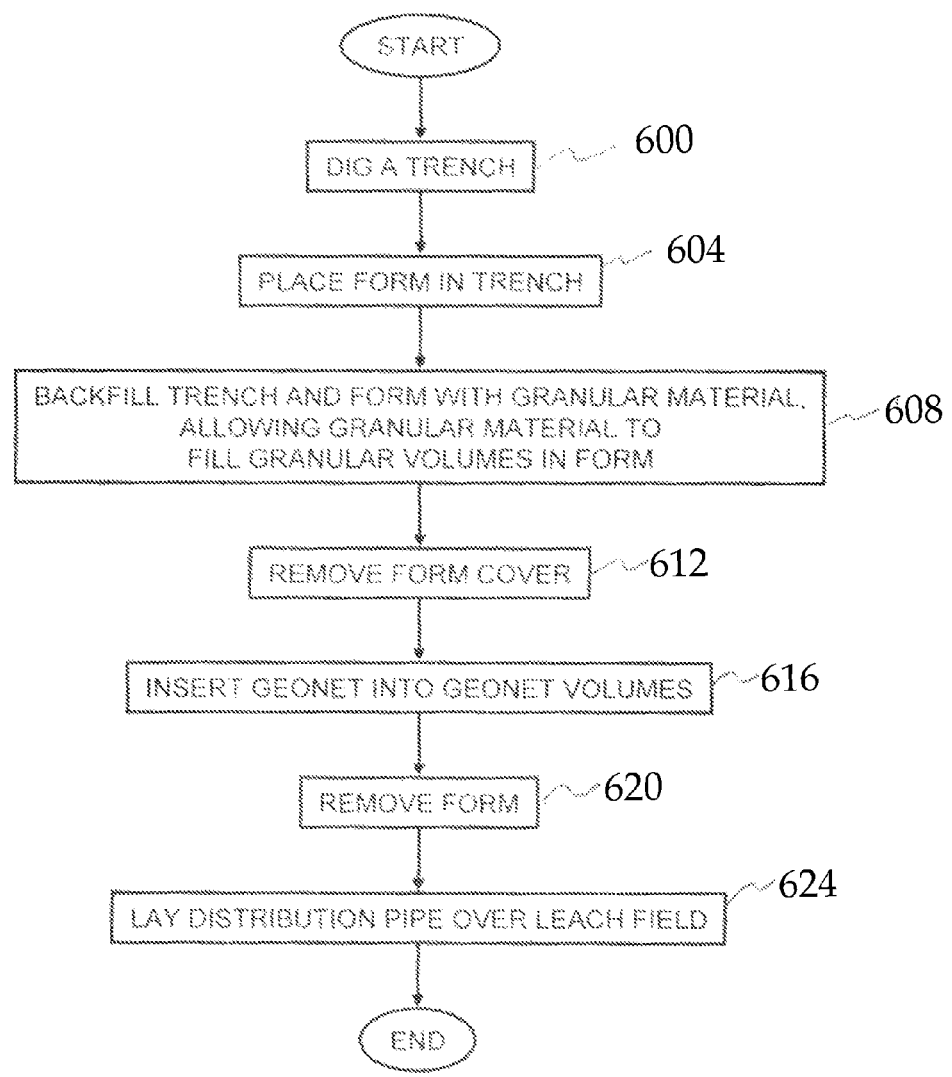
FIG. 28 is a flowchart showing one embodiment of the disclosed method of using a leach field form.

FIG. 28 shows a flowchart describing one disclosed method of using the disclosed forms. At act 600 a user or installer digs a trench. At act 604, the user places a form in the trench. The form, may have a cover attached during this step, or the cover may be placed on the form after the form is in the trench. At act 608, the trench is backfilled, allowing backfill to fill any granular volumes in the form (some forms may not have granular volumes, see FIGS. 25-27). Because the cover is on the form, backfill will not enter the geonet volume. At act 612 the form cover is removed. At act 616 geonet is inserted into the geonet volume(s). Crushed stone, or plastic pieces or other granular or permeable media may be used as a substitute for geonet. At act 620, the form is removed from the trench, leaving behind the geonet located within the backfill. At act 624 a distribution pipe is placed over the geonet and backfill (which is now the leach field).

Figure 24:
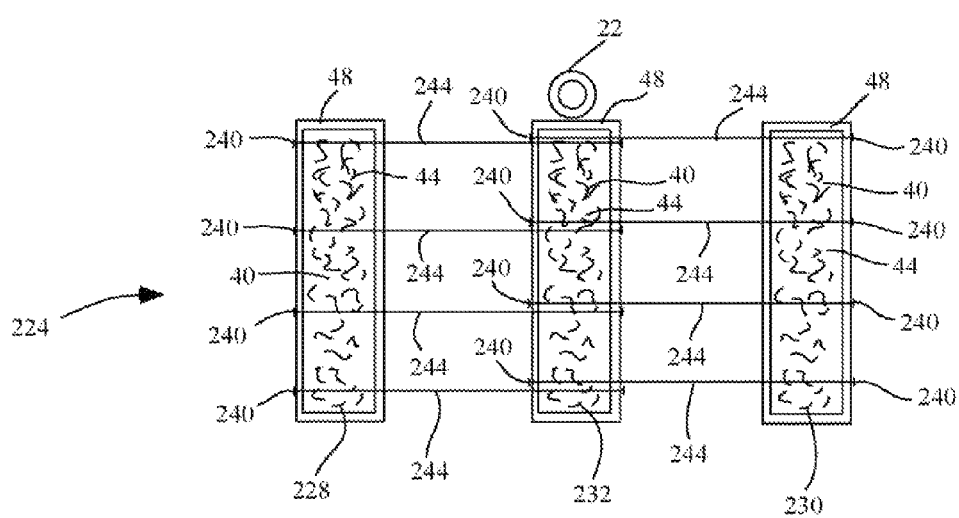
FIG. 24 is a cross-sectional view of another disclosed conduit.

FIG. 24 shows a cross-sectional view of another embodiment of the disclosed conduit. In this figure, the high aspect ratio conduit 224 comprise a plurality of channels 228, 232, 236. Each channel is a generally rectangular volume, within which is a geonet 40. The irregularly coiled stringy structure 44 that makes up the geonet 40 is shown in this view. Each geonet 40 is enclosed in an air and water permeable sheeting 48. One or more dosing pipes 22 will be in fluid communication with the channels. A low aspect ratio conduit can be substituted for dosing pipe 22. Additionally, there are a plurality of pairs of anchors 240, attached to the permeable sheeting on adjacent channels. Each pair of anchors 240 is attached to a line 244. The anchors 240 and lines 244 are configured to allow the channels 228, 232, 236 to be spaced a predetermined amount in the ground to facilitate the backfilling of the volumes between adjacent channels 228, 232, 236 with sand, or other backfill. However since the lines 244 are attached to adjacent channels, the channels 228, 232, 236 may be collapsed (i.e. set close together) for shipping. The anchors 240 may be any suitable attaching device, including but not limited to staples, plastic staples, washers. The lines 244 may be any suitable line, including but not limited to nylon line, rope, twine, chain link. To install the disclosed conduit 224, the channels 228, 232, 236 are expanded to the maximum separation distance between them, given the length of the lines 244. Stakes are typically driven into the soil to prevent the conduits from moving around in the trench and to keep them at the desired distance apart as determined by the lines 244. Although three channels 228, 232, 236 are shown in the embodiment, one of ordinary skill will understand that this conduit may be modified to have fewer channels, or more channels, such as 10 or more channels.

In use, the disclosed high aspect ratio channels will be periodically dosed with wastewater so as to fill conduit and displace gas. As the wastewater drains out of the high aspect ratio channels, air is pulled in "behind" the wastewater. Additionally, the system may be configured to fully drain the high aspect ratio channels between doses. This helps maintain aerobic conditions in the conduit and helps oxidize the sludge/biomat. Prior art devices are designed to provide storage volume for water in the channels. This storing or water in the conduit results in the persistence of anaerobic conditions at the soil interface and subsequent organic buildup and less favorable conditions for treatment. Thus the current invention may configured to fill about 25 to about 100% of the channel void space per dose and allowing the channel to largely drain before the next dose. Preferably, the time between dosing will about two times the time for a dose of water to percolate into the soil. It is conceived that that will better enable the high aspect channel and recently-saturated soil near the high aspect channel to drain of water, and to refill with gas, which is in good part oxygen containing air, flowing downward through the soil and through the permeable top of the conduit. If air distribution pipes are connected to vents, the foregoing effect can be enhanced by suitable valving at the inlet end of the pipe or pipes, through the use of check valves on the vent lines, which valves will close when water is applied to the conduit. When the water percolates into the soil, it allows the check valve or similar functioning device to open and provide for the flow of air to replace an equal volume of water. With the high aspect ratio channels, the sidewalls will likely play more of a role in water draining than in the low aspect ratio conduits. Additionally, a larger water column due to the geometry of the channels will assist in the infiltration of gases into the channels as the water drains out of the channels.

The disclosed high aspect ratio channels will have an infiltration area to storage volume ratio of about 9 or greater. The infiltration area to storage volume ratio is calculated as follows: for a channel that is 1 foot high, 3 inches (0.25 feet) wide, and 10 feet long, the maximum storage volume of that channel is given by 1 foot×0.25 feet×10 feet, which is 2.5 ft$^3$. The infiltration area is given by adding together the surface areas of the left and right side of the conduit and the bottom of the conduit. The left side of the conduit is given by: 1 foot×10 feet which equals 10 ft$^2$. The right side of the conduit is given by: 1 foot×10 feet which equals 10 ft$^2$. The bottom of the conduit is given by 0.25 feet×10 feet which equals 2.5 ft$^2$. Adding them together gives 22.5 ft$^2$. The infiltration area to storage volume ratio is therefore 22.5 ft$^2$÷2.5 ft$^3$=9 ft$^{-1}$. The distal ends of the volumes 128 and the interface of the volumes 128 and the volume 112 were ignored because we are omitting surfaces at opposing angles, and parallel surfaces closer than about 4 inches apart. The logic for this is that saturated soils can result in proximity to infiltrative surfaces so close together, and gas movement in these regions is inhibited, which may lead to less aerobic conditions that desired. The disclosed conduits will have widths greater than about ½ inch.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:
1. A system for wastewater comprising:
   a plurality of channels, where the channels each have a height to width aspect ratio in a range of as high as 96 and as low as 3, each have an uppermost surface and each include a pair of upright infiltrative surfaces, where the paired upright infiltrative surfaces of each channel are substantially parallel to each other along a majority of their length, and have a length of substantially one foot or more, where adjacent channels are separated along a majority of their length by two or more inches, the separations comprising sand, or a granular material, or a void comprising the majority or all of the volume of the separation, the separations having a spacing of one foot or more along their length without an intervening intersecting infiltrative surface that connects the adjacent channels within the spacing, at least two channels being interconnected to each other below their uppermost surface, and a first wastewater delivery conduit with wastewater egress openings positioned such that the area of the conduit having the wastewater egress openings traverses a majority of the paired infiltrative surfaces at an oblique or perpendicular angle.

2. The system for wastewater of claim 1 wherein the separations between adjacent pairs do not include interconnecting infiltrative surfaces along the length of the adjacent pairs.

3. The system for wastewater of claim 1 wherein the plurality of channels are in fluid communication with a septic wastewater supply and wherein two adjacent channels are interconnected at an end of each.

4. The system for wastewater of claim 1 further comprising:
a second wastewater delivery conduit that has an aspect ratio in a range of as high as 96 and as low as 3, and is in fluid communication with the plurality of channels.

5. The system for wastewater of claim 4 wherein the plurality of channels and the second wastewater delivery conduit are made of the same material.

6. The system for wastewater of claim 5 wherein the second wastewater delivery conduit has a high aspect ratio in a range of as high as 96 and as low as 3.

7. The system for wastewater of claim 5 wherein the first wastewater delivery conduit does not have a high aspect ratio in a range of as high as 96 and as low as 3.

8. The system for wastewater of claim 1 wherein the area of the first wastewater delivery conduit having wastewater supply egress openings traverses a majority of the tops or sides of the paired infiltrative surfaces.

9. The system for wastewater of claim 1 wherein each of the plurality of channels are rectangular and are interconnected at an end.

10. The system for wastewater of claim 1 wherein each of the plurality of channels are one and one-half feet to five feet in length and wherein the separation between adjacent pairs of infiltrative surfaces comprises a void occupying at least the majority of the volume of the separation.

11. The system for wastewater of claim 1 wherein the plurality of channels comprises eight or more channels and wherein the plurality of channels forms u-shapes.

12. The system for wastewater of claim 1 wherein the plurality of channels are interconnected at least at a bottom elevation.

13. The system for wastewater of claim 1 wherein the plurality of channels comprise one or more of the following: irregularly coiled stringy structure or granular material or plastic-three dimensional grid or polystyrene aggregate or a hollow.

14. The system for wastewater of claim 1 wherein the plurality of channels are one and one-half feet or more in length and wherein the separation between adjacent pairs of infiltrative surfaces comprises a void occupying at least the majority of the volume of the separation.

15. The system for wastewater of claim 1 wherein the plurality of channels have infiltrative surfaces that are one and one-half feet to ten feet in length.

16. The system for wastewater of claim 1 wherein the plurality of channels are supported by a structural framework.

17. The system for wastewater of claim 1 wherein the plurality of channels are supported by a non-biodegradeable structural framework.

18. The system for wastewater of claim 1 wherein the plurality of channels are self supporting and wherein the majority or all of the volume of the separation between adjacent pairs of infiltrative surfaces is a void.

19. The system for wastewater of claim 1 wherein the channels of the plurality are interconnected.

20. The system for wastewater of claim 1 where the paired infiltrative surfaces of each channel of the plurality are parallel to each other along a majority of their length, are spaced two to four inches apart, and have a length of one foot or more.

21. The system for wastewater of claim 1 where the separations have a spacing of one foot or more along their length without an intervening perpendicular infiltrative surface that connects the adjacent channels within the spacing.

22. A system for wastewater comprising:
a plurality of channels, each channels of the plurality having a height to width aspect ratio in a range of as high as 96 and as low as 3, and having an uppermost surface, the channels of the plurality being substantially parallel and having a length of substantially one foot or more, at least two of the channels being interconnected to each other below their uppermost surface, the channels of the plurality each comprising an upright infiltrative surface, where the upright infiltrative surfaces of adjacent channels are separated along a majority of their lengths by two or more inches and each have a spacing of one foot or more along their length without an intersecting infiltrative surface that connects the adjacent channels within the spacing; and a wastewater distribution conduit, the distribution conduit positioned such that an area of the conduit having wastewater supply egress openings, traverses a majority of the channels of the plurality at an oblique or perpendicular angle and traverses separations between adjacent channels of the plurality at an oblique or perpendicular angle, the separations between adjacent channels of the plurality comprising a void comprising the majority or all of the space of the separation, or sand, or a granular material.

23. The system for wastewater of claim 22
wherein the majority of the channels of the plurality are one foot to ten feet in length, and
wherein adjacent channels of the plurality are separated by four or more inches.

24. The system for wastewater of claim 22 wherein the majority of the channels of the plurality are interconnected.

25. The system for wastewater of claim 22
wherein adjacent channels of the plurality are separated by two to four inches.

26. A system for wastewater comprising:
two opposing upright substantially parallel infiltrative surfaces, where a first infiltrative surface borders on a first channel and a second infiltrative surface borders on a second channel, the first channel and the second channel having a height to width aspect ratio in a range of as high as 96 and as low as 3,
the first channel having an uppermost surface,
the second channel having an uppermost surface, and
the first channel and the second channel being interconnected to each other at least below their uppermost surface,
wherein the opposing infiltrative surfaces each have a length of one foot or more,
wherein the opposing infiltrative surfaces are separated along a majority of their length by two or more inches,
wherein the separation between opposing infiltrative surfaces is not comprised of the first channel or the second channel and comprises a void occupying at least the majority of the volume of the separation; and
a wastewater distribution conduit with wastewater egress openings, the distribution conduit positioned such that the area of the conduit having wastewater egress openings traverses the opposing infiltrative surfaces at an oblique or perpendicular angle and traverses the separation between the opposing infiltrative surfaces at an oblique or perpendicular angle.

27. The system of claim 26 where the opposing infiltrative surfaces are separated along a majority of their length by four or more inches.

28. The system of claim 26 wherein the opposing infiltrative surfaces have spacings along their length of one foot or greater in which the surfaces are not interconnected by a third infiltrative surface traversing these spacings.

* * * * *